(12) United States Patent
Sato et al.

(10) Patent No.: US 10,745,277 B2
(45) Date of Patent: Aug. 18, 2020

(54) OZONE GENERATING METHOD

(71) Applicant: Toshiba Mitsubishi-Electric Industrial Systems Corporation, Chuo-ku (JP)

(72) Inventors: Takasho Sato, Tokyo (JP); Yoichiro Tabata, Tokyo (JP); Yuji Ono, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 14 days.

(21) Appl. No.: 15/773,650

(22) PCT Filed: Dec. 8, 2015

(86) PCT No.: PCT/JP2015/084361
§ 371 (c)(1),
(2) Date: May 4, 2018

(87) PCT Pub. No.: WO2017/098575
PCT Pub. Date: Jun. 15, 2017

(65) Prior Publication Data
US 2018/0327264 A1  Nov. 15, 2018

(51) Int. Cl.
*C01B 13/11* (2006.01)
(52) U.S. Cl.
CPC ..................... *C01B 13/11* (2013.01)
(58) Field of Classification Search
None
See application file for complete search history.

(56) References Cited

U.S. PATENT DOCUMENTS 7,382,087 B2  6/2008  Tabata et al.
7,402,289 B2  7/2008  Tabata
7,713,495 B2  5/2010  Wada et al.
(Continued)

FOREIGN PATENT DOCUMENTS

EP  1 905 512 A1  4/2008
EP  2 484 632 A1  8/2012
(Continued)

OTHER PUBLICATIONS

Extended European Search Report dated Apr. 2, 2019 in the corresponding European Application No. 15910192.2 citing documents AA, AO-AP therein 10 pages.
(Continued)

*Primary Examiner* — Kishor Mayekar
(74) *Attorney, Agent, or Firm* — Xsensus LLP

(57) ABSTRACT

As a metal compound layer provided between a dielectric and a ground electrode of an ozone generator, there is used a metal compound satisfying the condition (1) the metal compound is not a substance promoting ozone decomposition, the condition (2) the metal compound is not a conductor, the condition (3) the band gap of the metal compound layer is in the range of 2.0 to 4.0 (eV), and the condition (4) the hole potential of a valence band portion formed in the excited state of the metal compound layer is larger than the binding potential (1.25 (eV)) of an oxygen molecule. In addition, as ozone generation processing are executed under an environment in which various ozone decomposition suppression requirements for suppressing a decomposition amount of ozone are imposed on the ozone generator.

6 Claims, 11 Drawing Sheets

(56) References Cited

U.S. PATENT DOCUMENTS

| | | |
|---|---|---|
| 8,911,675 B2 | 12/2014 | Matsuno |
| 2004/0223893 A1 | 11/2004 | Tabata et al. |
| 2006/0049738 A1 | 3/2006 | Tabata et al. |
| 2008/0128269 A1 | 6/2008 | Matsuno |
| 2008/0206115 A1 | 8/2008 | Tabata et al. |
| 2008/0213140 A1 | 9/2008 | Tabata et al. |
| 2012/0103791 A1 | 5/2012 | Tabata et al. |

FOREIGN PATENT DOCUMENTS

| | | | |
|---|---|---|---|
| JP | 2004-359537 A | | 12/2004 |
| JP | 3642572 B2 | | 4/2005 |
| JP | 2011-68530 A | | 4/2011 |
| JP | 4825314 B2 | | 11/2011 |
| JP | 4932037 B2 | | 5/2012 |
| JP | 4948007 B2 | | 6/2012 |
| JP | 4953814 B2 | | 6/2012 |
| JP | 5052304 B2 | | 10/2012 |
| JP | 5069800 B2 | | 11/2012 |
| JP | 5121944 B2 | | 1/2013 |
| JP | 5369189 B2 | | 12/2013 |
| KR | 10-0756797 B1 | | 2/2006 |
| TW | I263617 B | | 10/2006 |
| WO | WO 2005/080263 A1 | | 9/2005 |
| WO | WO 2011/039971 A1 | | 4/2011 |

OTHER PUBLICATIONS

International Search Report dated Mar. 1, 2016 in PCT/JP2015/084361 filed Dec. 8, 2015.

Office Action dated Nov. 23, 2016 in TW105107012 (with partial English translation).

Office Action dated Mar. 29, 2017 in TW105107012 (with partial English translation).

Japanese Office Action dated Mar. 26, 2019 in Japanese Patent Application No. 2017-554691 (with English translation), 10 pages.

International Preliminary Report on Patentability and Written Opinion dated Jun. 21, 2018 in PCTIJP2015/084361 (with English translation), 16 pages.

Korean Notice of Final Rejection dated Feb. 24, 2020, issued in corresponding Korean Patent Application No. 10-2018-7015814.

Korean Notification of Reason for Refusal dated Apr. 16, 2020, issued in corresponding Korean Patent Application No. 10-2018-7015814.

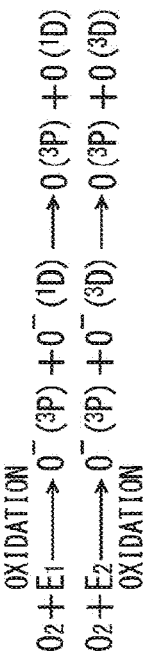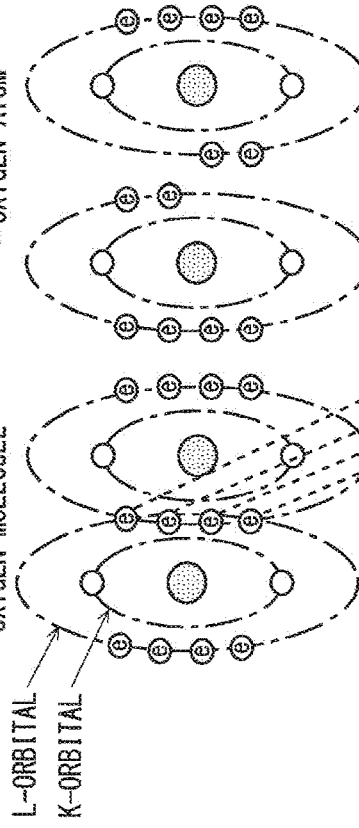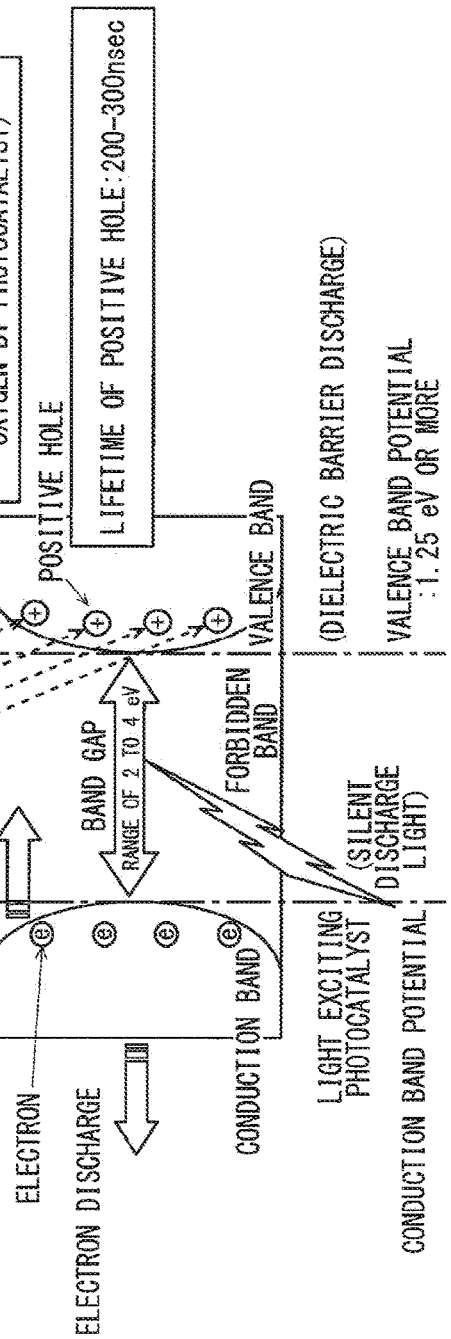

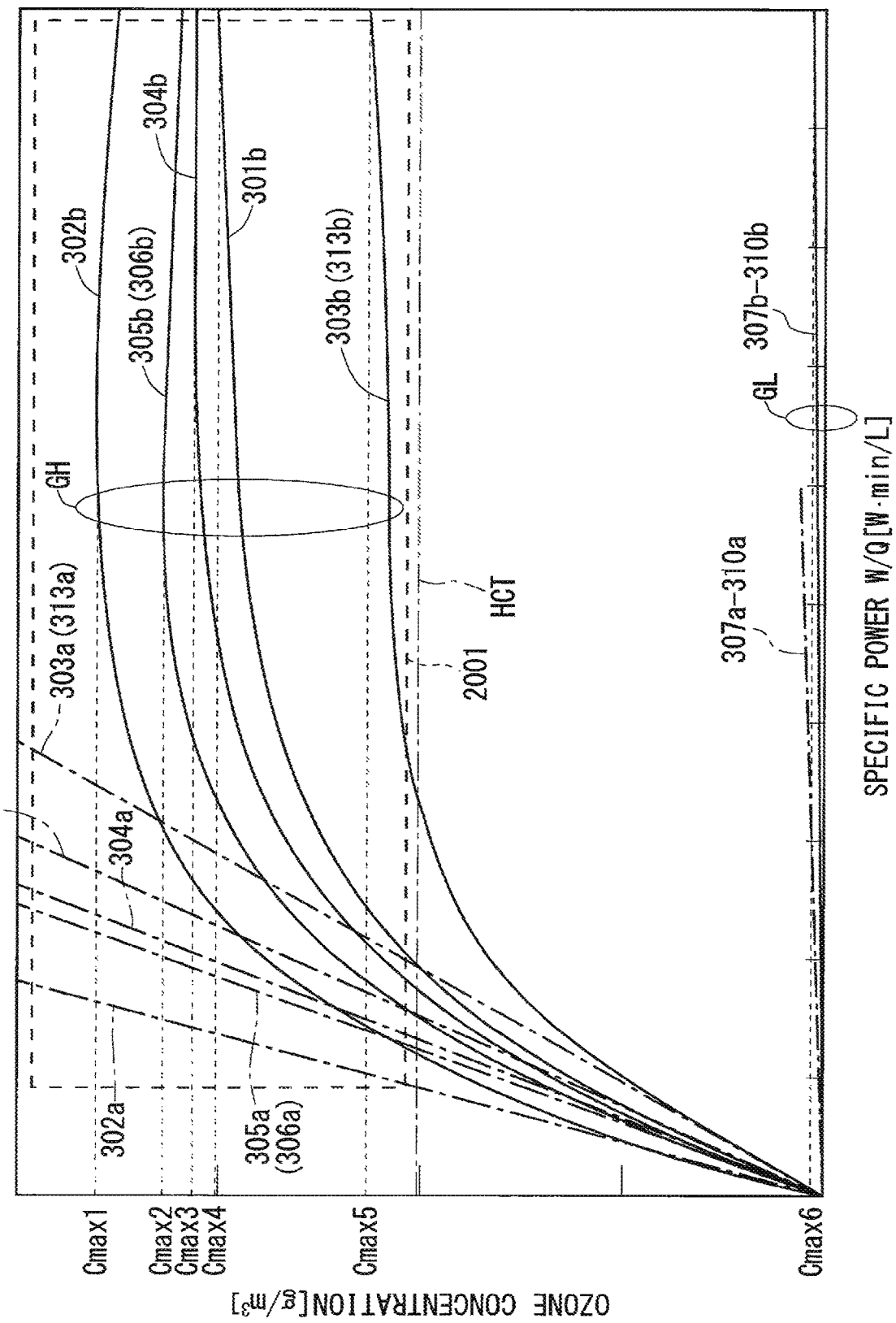

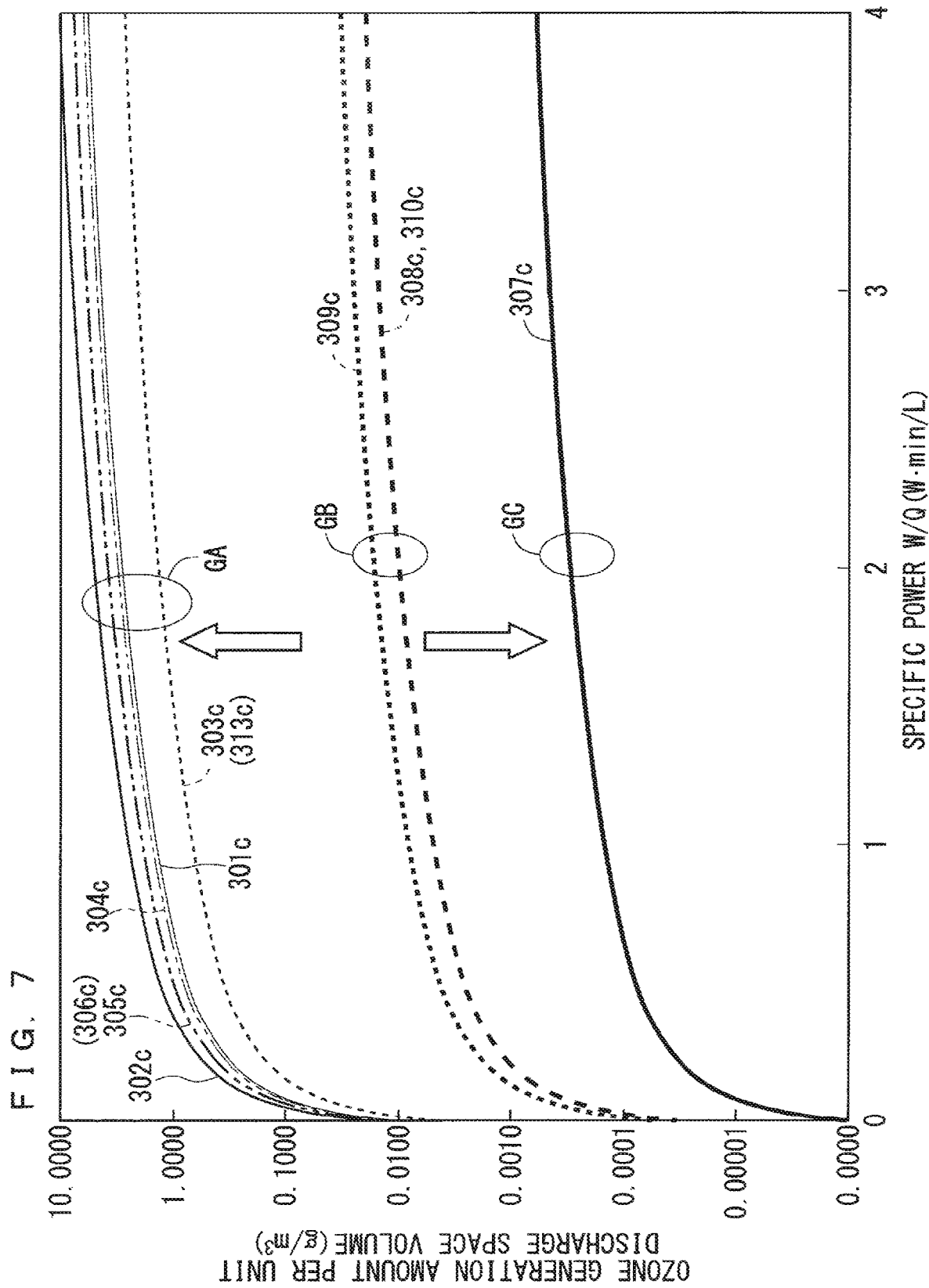

F I G. 8

| MATERIAL PRODUCT NO. | 301 | 302 | 303 | 304 | 305 | 306 | 307 | 308 | 309 | 310 | 311 | 312 | 313 |
|---|---|---|---|---|---|---|---|---|---|---|---|---|---|
| METAL ELEMENT | CHROMIUM (Cr) | TUNGSTEN (W) | VANADIUM (V) | MOLYBDENUM (Mo) | NIOBIUM (Nb) | TANTALUM (Ta) | NICKEL (Ni) | ZINC (Zn) | YTTRIUM (Y) | ZIRCONIUM (Zr) | ALUMINUM (Al) | SILICON (Si) | BISMUTH (Bi) |
| METAL COMPOUND SUBSTANCE | $CrO_3$, $Cr_2O_3$ | $WO_3$ | $V_2O_5$ | $MoO_3$ | $NbO_5$ | $Ta_2O_5$ | $NiO$ | $ZnO$ | $Y_2O_3$ | $ZrO_2$ | $Al_2O_3$ (ALUMINA) | $SiO_2$ (QUARTZ) | $Bi_2O_3$ |
| BAND GAP (eV) | 2.2, 3 | 2.5 | 2.5 | 3 | 3.4 | 4 | 3.5 | 3.3 | 6 | 5 | 8.8 | 8.9 | 2.6 |
| HOLE POTENTIAL (V) | 2.0, 0.7 | 3 | 2.9 | 2.5 | 3.4 | 3.1 | 0.54 | 3.2 | 3.7 | 4 | — | — | 2.85 |
| OZONE DECOMPOSITION CATALYTIC SUBSTANCE | — | — | — | — | — | — | ○ | — | — | — | — | — | — |
| OZONE GENERATION CATALYTIC SUBSTANCE EFFECTIVE FOR OZONE GENERATION ACCORDING TO THE PRESENT INVENTION | ◎ | ◎ | ◎ | ◎ | ◎ | ◎ | × | × | × | × | × | × | ◎ |
| OZONE GENERATION EFFICIENCY η [mg/J] | 0.0307 | 0.0500 | 0.0138 | 0.0377 | 0.0406 | 0.0426 | 2.78E-06 | 9.49E-05 | 1.59E-04 | 9.49E-05 | — | — | 0.0155 |
| MAXIMUM OZONE CONCENTRATION [g/m3] | 200–500 | | | | | | 0.2 | 6 | 11 | 6.2 | <20 | <20 | 219 |

DIELECTRIC OXIDE HAVING SEMICONDUCTOR PROPERTIES (301–308)
DIELECTRIC OXIDE HAVING INSULATING PROPERTIES (309–312)

OZONE GENERATING METHOD

TECHNICAL FIELD

The present invention relates to an ozone generating method for generating high concentration ozone using an ozone generator having first and second electrodes facing each other and a dielectric formed on the first electrode and having a discharge space between the dielectric and the second electrode.

BACKGROUND ART

Initially, in ozone generation technique, in 1930 Chapman said that among cosmic rays from space and solar light energy, those having a wavelength of not more than 242 nm become oxygen atoms by giving energy to an oxygen molecule, and the oxygen atoms and the oxygen molecules are bonded to generate ozone, and further it has been said that the generated ozone absorbs light having a wavelength of not more than 320 nm, decomposition reaction into oxygen molecules and oxygen atoms proceeds simultaneously, and ozone is generated by a balance between decomposition reaction of oxygen and decomposition reaction of ozone.

In ozone existing in the ozone layer in part of the stratosphere on the earth and having a concentration of approximately 2 to 8 ppm, ozone generation due only to cosmic rays and solar light energy cannot be sufficiently explained from the cosmic rays and the solar light energy, and it has been said that such ozone generation is closely related to the plasma density of the ionosphere in the stratosphere ($10^5$ pieces/cm$^3$). In other words, not only oxygen gas absorbs cosmic rays and solar light energy having a wavelength of not more than 242 nm and dissociates into oxygen atoms, but a high-speed electron density of the plasma of the ionosphere collides with oxygen molecules over the earth, so that dissociation into oxygen atoms occurs. In other words, it is said that in the ozone layer, dissociation of oxygen atoms is caused by two effects, that is, by light absorption of cosmic rays and sunlight and electron collision in the plasma of the ionosphere.

It is theoretically proven that an ozone concentration of approximately 2 to 8 ppm is generated by three-body collision between oxygen atoms and oxygen molecules dissociated by those two methods. When the ozone concentration of approximately 2 to 8 ppm of the ozone layer is represented by the number of ozone, it is $4 \times 10^{12}$ pieces/cm$^3$, and this corresponds to $10^7$ times the plasma density of the ionosphere ($10^5$ pieces/cm$^3$); however, this value is said to be reasonable, considering the fact that a gas density over the earth is 1/100 of the earth's surface (in the atmosphere) and the decomposition rate of ozone is also very low due to collision with a wall.

From around the 1940's, researches on discharge ozone generators have been actively conducted, and ozone concentrations exceeding the ozone concentration of the ozone layer have come to be obtained. In particular, in a silent discharge (dielectric barrier discharge) method via a dielectric, particular attention has been paid to plasma capable of injecting high electric power in a high electric field, and ozone generators of high concentration and large capacity have been developed.

In the 1990's, the oxidizing power of ozone obtained from an ozone generator has been utilized, and a film formation technique of a semiconductor insulating film has gained attention, so that a high-purity ozone gas has been required.

In order to obtain the high-purity ozone gas, an ozone generator using a high-purity oxygen gas as a raw material gas has been required. However, in conventional ozone generators, it was clarified that if the high purity oxygen gas is used as the raw material gas, only an ozone concentration of not more than several tens g/m$^3$ (several thousands ppm) could be obtained and research to fundamentally reconsider an ozone generation mechanism in the conventional ozone generator was started. There have been started various positive elucidations on various phenomena such as "relationship between discharge plasma density (electron density) and generated ozone concentration", "relationship between raw material gas and generated ozone concentration", "relationship between discharge surface material and generated ozone concentration", and "regarding ozone decomposition degree in discharge plasma".

What is noteworthy here is that although it has been conventionally believed that ozone of high concentration exceeding 200 (g/m$^3$) (93,333 ppm) is generated by discharge plasma density (that is, electron density), discharge electron density ($10^{16}$ pieces/cm$^3$) in an ozone generator is a much higher electron density than the electron density of the ionosphere ($10^5$ pieces/cm$^3$). Since the gas density is also very high and there are walls on both discharge surfaces of a discharge space of the ozone generator, not only ozone can be generated by collision of electrons, but in ozone generated by electrons, an amount to be decomposed increases due to collision of generated ozone with electrons and molecules and collision with the wall of the discharge surface, and an amount of ozone generated by electrons of discharge plasma is assumed to be approximately less than several tens (g/m$^3$) (4000 ppm). A sufficient explanation cannot be provided by only oxygen atom dissociation due to collision of ozone generated by a conventional ozone generator with oxygen molecules and high-speed electrons, and a mechanism in which high concentration ozone can be generated has remained unclear.

As a conventional high-concentration ozone generation technique in 2003, there is a prior art document disclosed in Patent Document 1 as an invention relating to catalyst production of oxygen atoms by a raw material gas and discharge, and there are prior art documents such as Patent Documents 2 to 6 as inventions relating to photocatalyst production of oxygen atoms by a material of a discharge surface and discharge.

In the prior art, although high concentration ozone is generated by an ozone generator, there has been discussed a theory that if a raw material gas is a high purity oxygen gas, decomposition of generated ozone is promoted by oxygen gas, and a high concentration ozone gas cannot be taken out. As means for suppressing this ozone decomposition theory, attention has been paid to a nonconductive film on a discharge surface, and further, as an invention relating to suppression of decomposition of ozone generated by a material of a discharge surface in an ozone generator, there are prior art documents such as Patent Documents 7 to 9.

In the technique disclosed in Patent Document 1, as an ozone generator capable of generating high concentration ozone having a concentration of not less than 200 (g/m$^3$) (93,333 ppm), an ozone generator in which nitrogen gas of 0.1% (1000 ppm) to several % (several tens of thousands of ppm) is added to oxygen gas as a raw material gas to be supplied is used. Patent Document 1 describes that the raw material gas described above is used, nitrogen gas added in a slight amount is converted to nitrogen oxide gas by discharge, and this slight amount of nitrogen oxide gas has the ability to catalyze dissociation of a large amount of oxygen molecules and generate a high concentration of oxygen atoms, so that high concentration ozone can be generated and taken out by a three-body collision reaction of the high concentration of oxygen atoms generated through nitrogen oxide and oxygen molecules.

Patent Documents 2 to 6 show that high concentration ozone is generated by applying a photocatalytic substance to a discharge surface.

The techniques disclosed in Patent Documents 7 and 8 are each an invention in which ozone generated in an ozone generator is taken out without being decomposed, and are inventions completely different from Patent Documents 1 to 6.

Patent Document 7 shows that "a transition metal containing alkaline metals, alkaline earth metals, or rare earth elements at position A of the transition metal oxide having a crystal structure in which an atom does not exist at position A of the perovskite structure is made to exist" on a discharge surface of the ozone generator, so that in the ozone generator, high concentration ozone can be taken out without decomposing generated ozone.

However, the specification of Patent Document 7, under the circumstances, has no description indicating how ozone concentration characteristics should be when it is assumed that ozone generated and developed based on a theoretically unknown theory is decomposed, and has description that only that taken-out ozone concentration is high in a compound applied onto the discharge surface. In addition, the description has a poor chemical basis for a perovskite structure and ozone decomposition inhibition effect. Although a demonstration test of ozone generation was carried out with $CaTiO_3$ as a representative metal compound having a perovskite structure, high concentration ozone was not demonstrated at all, and the reproducibility of the effect of Patent Document 7 was impossible.

In paragraphs [0041] to [0045] of the specification of Patent Document 7, it is described that "when 0.5 vol % of nitrogen gas was added to the high purity oxygen gas, there was almost no effect of adding the nitrogen gas"; however, Patent Document 7 does not show the test data as shown in Patent Document 1 but merely describes results based on poor evidence. Even for this test, if the reproducibility test is carried out, the effect of adding nitrogen gas is sufficient, the accuracy of Patent Document 1 is demonstrated, and it is a generally accepted fact in the ozone generator field.

Patent Document 8 discloses an ozone generator "in which a functional substance to hinder a decrease of the ozone concentration is fixed on the surface of a dielectric by a baking fixing agent (that is, the functional substance is contained in ceramic)"; however, the method of the present invention is the fact described in Patent Documents 1, 2 to 4 and 6, and Patent Documents 2 and the like and Patent Document 8 differ only in a functional substance having ozone generation ability and a functional substance to hinder a decrease of the ozone concentration, and differences in production techniques are not recognized. Although it is concluded that the described functional substance is the functional substance (catalytic substance) to hinder the decrease of the ozone concentration, the specification merely describes demonstration data in which high concentration ozone was obtained, and it is unknown whether the factor that high concentration ozone is obtained is due to the factor that hinder the decrease of the ozone concentration.

In general, in catalytic reactions, it is defined by accelerating the reaction of decomposing ozone and oxygen. However, as described in Patent Document 8, evidence functioning to hinder the decrease of the ozone concentration is not sufficiently described in the content of the specification of Patent Document 8.

In Patent Document 9, a functional film limited to an ozone generator surface is shown.

PRIOR ART DOCUMENTS

Patent Documents

Patent Document 1: Japanese Patent No. 3642572 (U.S. Pat. No. 7,402,289)
Patent Document 2: Japanese Patent No. 4953814 (U.S. Pat. No. 7,382,087)
Patent Document 3: Japanese Patent No. 5069800 (U.S. Pat. No. 7,382,087)
Patent Document 4: Japanese Patent No. 4825314 (U.S. Pat. No. 7,382,087)
Patent Document 5: Japanese Patent No. 4932037 (U.S. Pat. No. 7,382,087)
Patent Document 6: Japanese Patent No. 5121944 (U.S. Pat. No. 7,382,087)
Patent Document 7: Japanese Patent No. 4948007 (U.S. Pat. No. 8,911,675)
Patent Document 8: Japanese Patent No. 5052304 (US Patent Application Publication No. 2008/0128269)
Patent Document 9: Japanese Patent No. 5369189 (International Publication No. 2011-039971)

SUMMARY

Problem to be Solved by the Invention

In the technique disclosed in Patent Document 1, a high concentration ozone gas can be generated by a gas chemical catalytic reaction during dielectric barrier discharge between oxygen gas as main raw material gas and a slight amount of nitrogen oxide gas; however, since the slight amount of nitrogen oxide gas is contained in the generated ozone gas, nitric acid vapor ($HNO_3$) gas having high chemical reactivity with metal is also generated. Metal contamination occurs due to the nitric acid vapor ($HNO_3$) gas which is the nitrogen oxide, and there have been problems such as the fact that clean ozone gas treatment cannot be performed. On the other hand, when a slight amount of nitrogen gas is added to oxygen gas to generate ozone gas, NOx gas of about several thousands ppm is generated in addition to the ozone gas, and high concentration of NOx gas is contained in exhaust gas after ozone treatment, so that a NOx gas removal device is required to be provided so as to discharge the NOx gas to the atmosphere, and there has been a problem with air pollution due to NOx gas.

In the techniques disclosed in Patent Documents 2 to 6, attention is drawn as a revolutionary invention, and it has been shown that a metal compound applied onto the discharge surface is a photocatalytic substance effect; however, specification of the photocatalytic substance for obtaining high concentration ozone is limited, and a range of the photocatalytic substance is not clear. That is, in the technical range disclosed in Patent Documents 2 to 6, it cannot be said that the conditions for sufficiently exerting the effect of generating ozone in the photocatalytic substance of the metal compound applied onto the discharge surface are defined in detail, and there has been a problem that it cannot be said that a method for generating high concentration ozone is necessarily sufficiently clarified.

Although the techniques disclosed in Patent Documents 7 to 9 are inventions that show a metal compound to be applied onto the discharge surface, they are not an invention for generating ozone on the discharge surface of the ozone generator but disclose that decomposition of ozone that is being generated is suppressed, the specification does not sufficiently show sufficient technique relating to inventions, and only by the technique for suppressing the decomposition of ozone, as a technical development for obtaining high concentration ozone, there have been many serious problems. In addition to that, in the disclosure matter of Patent Document 7, although the reproducibility test was carried out, reproduction could not be sufficiently performed, and problems have been exhibited as a high concentration ozone generating method. Although Patent Documents 8 and 9 describe fixing on the dielectric surface by the baking fixing agent (that is, the functional substance is contained in ceramic), this technique has already been clarified by the prior art (Patent Document 9), and it is pointed out as a problem. Patent Document 9 merely shows a functional film limited to the ozone generator surface, and there is a problem that it cannot be said that a method for sufficiently generating high concentration ozone is clarified.

The present invention aims to solve the above problems and to provide an ozone generating method capable of generating higher concentration ozone.

Means to Solve the Problem

An ozone generating method according to the present invention is an ozone generating method for generating ozone using an ozone generator which has first and second electrodes facing each other and a dielectric formed on the first electrode and has a discharge space between the dielectric and the second electrode. In this ozone generating method, the ozone generator further has a metal compound layer provided on at least one surface of the second electrode and the dielectric, the metal compound layer satisfies the following conditions (1) to (4): (1) the metal compound layer is not a material promoting ozone decomposition, (2) the metal compound layer is not a conductor, (3) the band gap of the metal compound layer is in a range of 2.0 to 4.0 [eV], and (4) the hole potential of a valence band portion formed in an excited state of the metal compound layer is larger than a binding potential of an oxygen molecule. This ozone generating method includes the steps of (a) supplying a raw material gas mainly composed of oxygen gas to the discharge space, (b) giving external energy, generating dielectric barrier discharge in the discharge space, and bringing the metal compound layer into a photocatalytic state by the discharge light to generate oxygen atoms from the raw material gas supplied in the step (a), (c) generating ozone by a collision chemistry reaction between the oxygen atoms generated in the step (b) and the oxygen gas contained in the raw material gas, and (d) executing the steps (a) to (c) under an environment in which an ozone decomposition suppression requirement for suppressing a decomposition amount of ozone is imposed on the ozone generator.

Effects of the Invention

Since the ozone generator used in the ozone generating method of the present invention has the metal compound layer satisfying the above conditions (1) to (4), the oxygen gas in the raw material gas passing through the discharge space can be selectively and catalytically dissociated to generate a high concentration of oxygen atoms, so that ozone generation efficiency in the ozone generator is set to, for example, not less than 0.01 mg/J (36 g/kWh), and high concentration ozone can be generated.

Further, when the ozone generator is set under the environment in which the ozone decomposition suppression requirement is imposed in the step (d), a phenomenon of decomposition of the ozone generated in the step (c) is suppressed, and a higher concentration ozone gas can be taken out to the outside.

The objects, features, aspects, and advantages of the present invention will become more apparent from the following detailed description and the accompanying drawings.

BRIEF DESCRIPTION OF DRAWINGS

FIG. 3 is an explanatory view schematically showing an electron coordination structure of the solid in the solid-state electron theory of a photocatalyst in silent discharge and a mechanism in which oxygen molecules are dissociated.

FIG. 6 is an explanatory view showing ozone concentration characteristics that can be taken out with respect to injected discharge energy due to a difference in substance of a metal compound.

FIG. 7 is an explanatory diagram showing logarithmic representation of an ozone generation amount with respect to the injected discharge energy per unit volume of a metal compound of a specific metal element.

FIG. 8 is an explanatory view summarizing physical properties of an oxide metal material in the ozone generator used in the present embodiment and a relationship between ozone generation efficiency η and a maximum ozone generation concentration Cmax in a table format.

DESCRIPTION OF EMBODIMENT

Embodiment (Overall Outline)

An overall outline of an embodiment according to the present invention will be described with reference to FIGS. 1 to 11.

Figure 1:
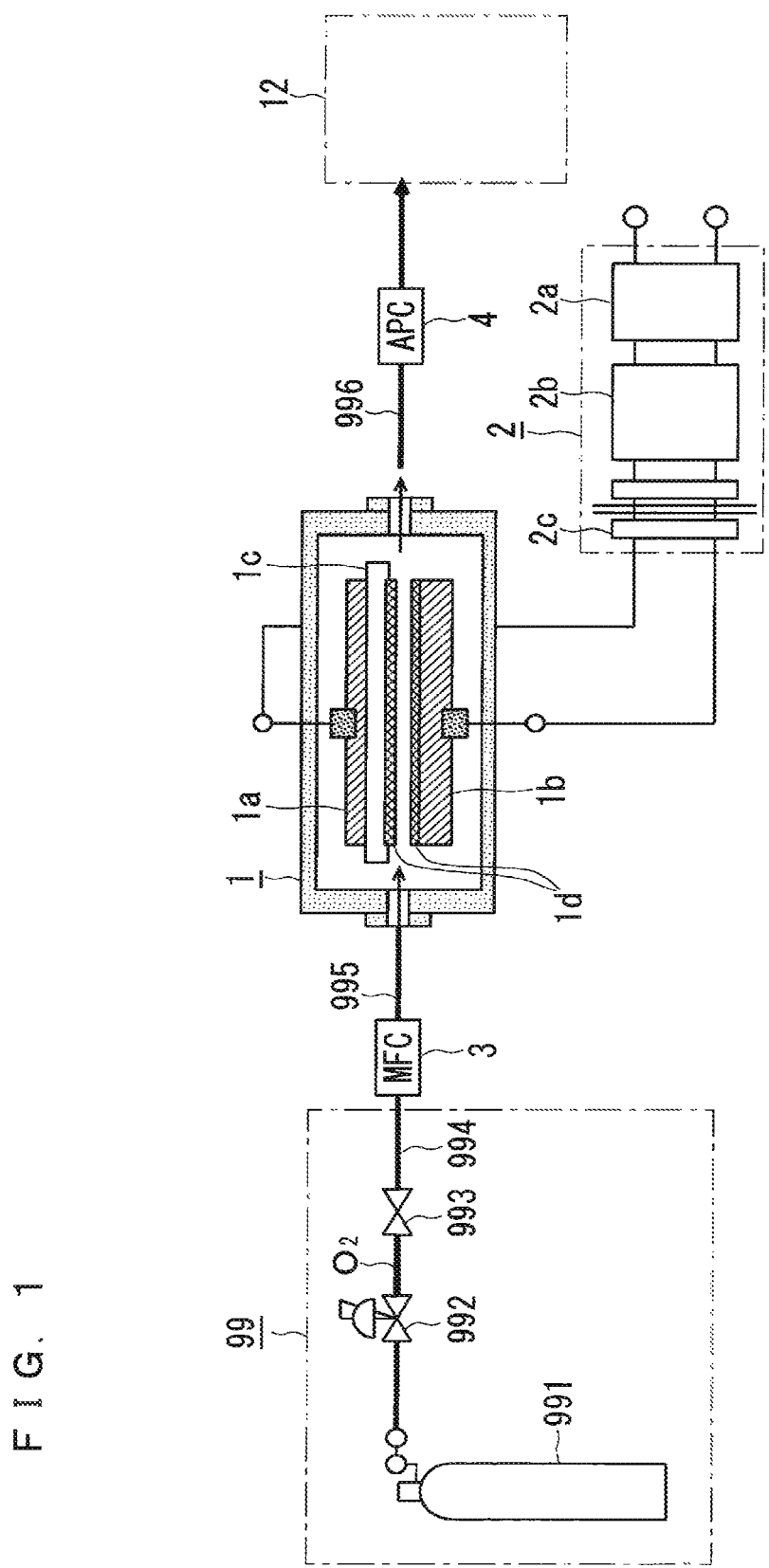
FIG. 1 is a block diagram showing a configuration of an ozone generator used in an ozone generating method according to an embodiment of the present invention.

FIG. 1 is a block diagram showing a configuration of a nitrogen-free ozone gas generator (hereinafter may be simply referred to as "ozone generator") used in an ozone generating method according to the embodiment of the present invention. That is, FIG. 1 is a block diagram showing a configuration of a gas system, focusing on an ozone generator.

Figure 2:
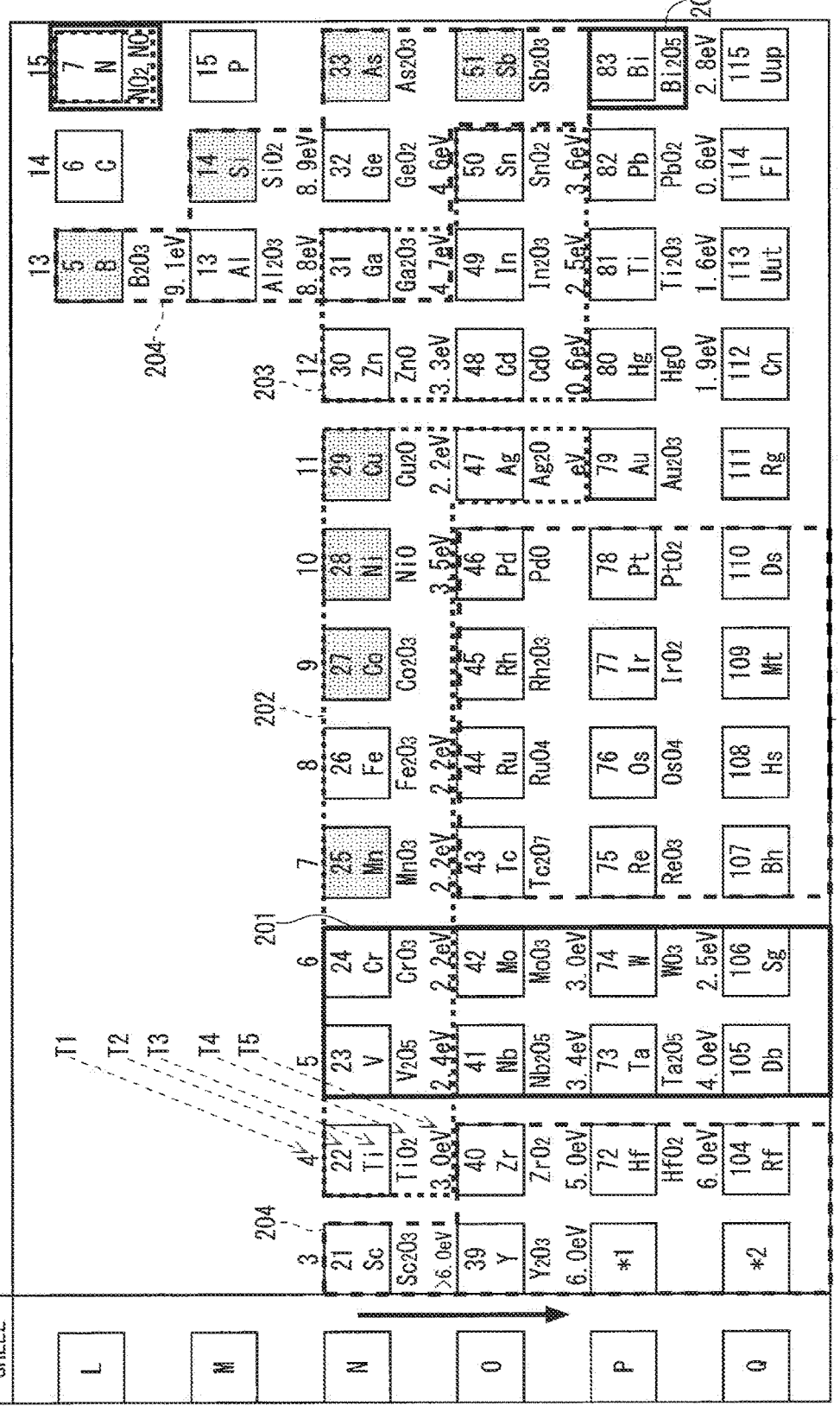
FIG. 2 is an explanatory view showing an element periodic table.

FIG. 2 is an explanatory view showing an element periodic table including a metal element range determined to be effective in the present invention. In FIG. 2, in the element periodic table, in particular, a range to which a metal element capable of obtaining a high concentration ozone gas with a metal compound having properties of a semiconductor belongs is shown as a first metal compound species 201, and a metal element of a metal compound that cannot obtain a high concentration ozone gas and has the properties of a semiconductor is also shown.

In FIG. 2, as classification items T1 to T5 of each element, the group T1, the atomic number T2, the atomic element T3, the metal compound T4 and the band gap T5 (the band gap of the metal compound T4) are shown. Hereinafter, features of the metal elements will be described along the atomic numbers indicated by the atomic numbers T2.

In particular, metal (element) compound materials of manganese Mn with atomic number 25, cobalt Co with atomic number 27, nickel Ni with atomic number 28, copper Cu with atomic number 29, and silver Ag with atomic number 47 are elements commonly known as ozone decomposition catalytic substances by contact with ozone.

Metal compound materials of zinc Zn with atomic number 30, gallium Ga with atomic number 31, germanium Ge with atomic number 32, cadmium Cd with atomic number 48, indium In with atomic number 49, and tin Sn with atomic number 50 are elements having conductivity that transmits light wavelength of visible light and are substances which are hard to excite the substances themselves by visible light energy.

In metal compound materials of aluminum Al with atomic number 13, silicon Si with atomic number 14, scandium Sc with atomic number 21, yttrium Y with atomic number 39, zirconium Zr with atomic number 40, and hafnium Hf with atomic number 72, the band gap is not less than 5 eV, and the metal compound material having a band gap of not less than 5 eV is usually defined as an insulator material and is a substance which is hard to excite (activate) the substance themselves with discharge light energy such as dielectric barrier discharge.

On the other hand, a metal compound material having a band gap of not more than 5 eV is usually defined as a semiconductor material having properties of a semiconductor. Even in the semiconductor material, if the band gap is not more than 4 eV, the semiconductor material is a substance capable of exciting and activating the substance itself with the discharge light energy of the dielectric barrier discharge.

Figure 4:
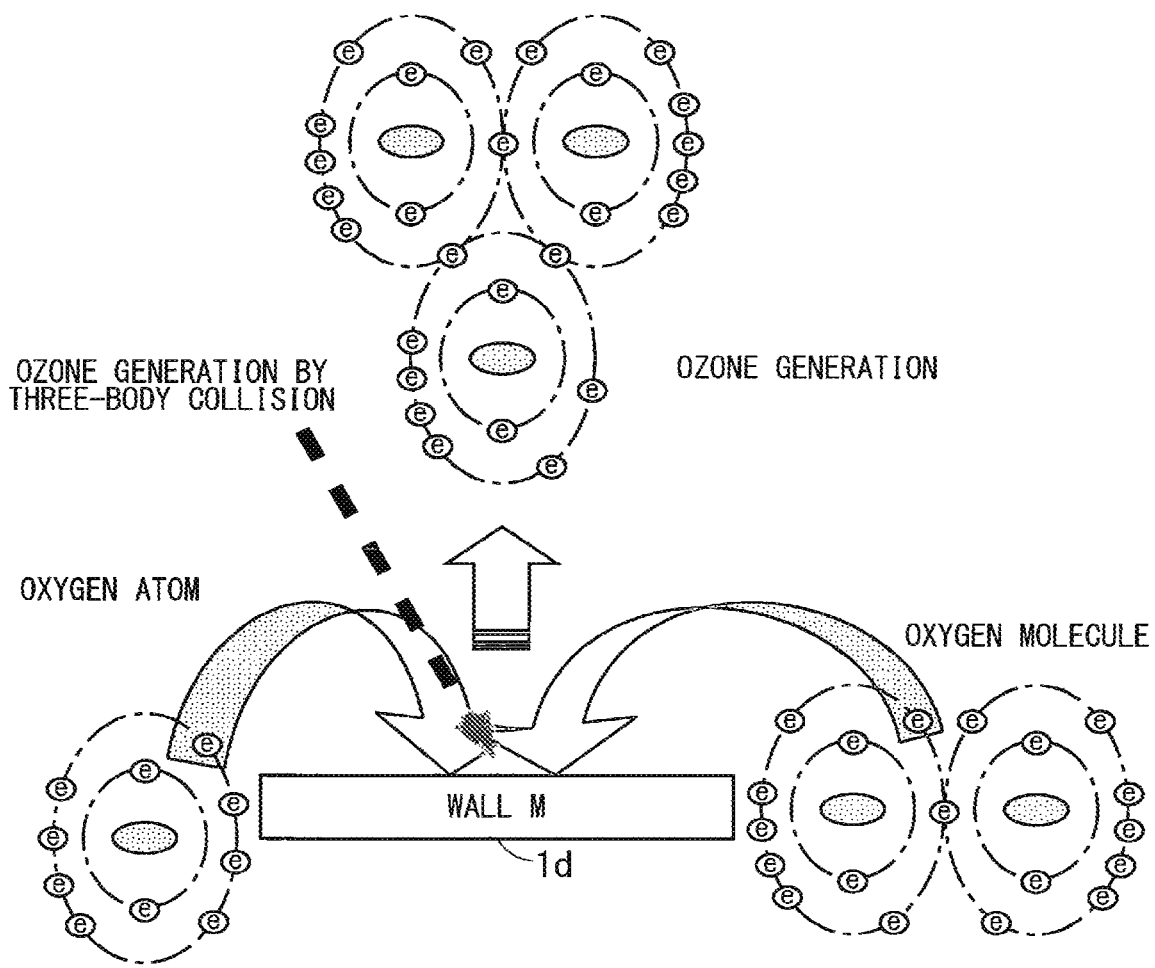
FIG. 4 is an explanatory view for schematically explaining a mechanism in which ozone is generated by three-body collision of oxygen atoms and oxygen molecules generated by the ozone generator.

FIG. 3 is an explanatory view schematically showing an electron coordination structure of the solid in the solid-state electron theory (band gap theory) of a photocatalyst in silent discharge and a mechanism in which oxygen molecules are dissociated. FIG. 4 is an explanatory view for schematically explaining a mechanism in which ozone is generated by three-body collision of oxygen atoms and oxygen molecules generated by an ozone generator 1.

FIGS. 3 and 4 each show a schematic diagram in which, in the ozone generator 1, in a discharge space formed between a dielectric 1c and a ground electrode 1b via the metal (element) compound layer 1d, a chemical reaction accelerating dissociation into oxygen atoms and an ozone formation reaction using oxygen atoms and oxygen are shown with a chemical reaction of a supplied raw material gas and a discharge surface material. Dielectric barrier discharge can be generated in the discharge space described above by applying external energy.

In particular, FIG. 3 shows an oxygen atom generation chemical reaction showing a dissociation reaction mechanism of oxygen molecules into oxygen atoms by oxygen gas (oxygen molecule) and an excited state (photocatalytic state) of a semiconductor material in the embodiment of the present invention. FIG. 4 shows an ozone generation chemical reaction showing a mechanism in which ozone is generated by a three-body collision reaction of oxygen molecules and generated oxygen atoms in the embodiment of the present invention.

Figure 5:
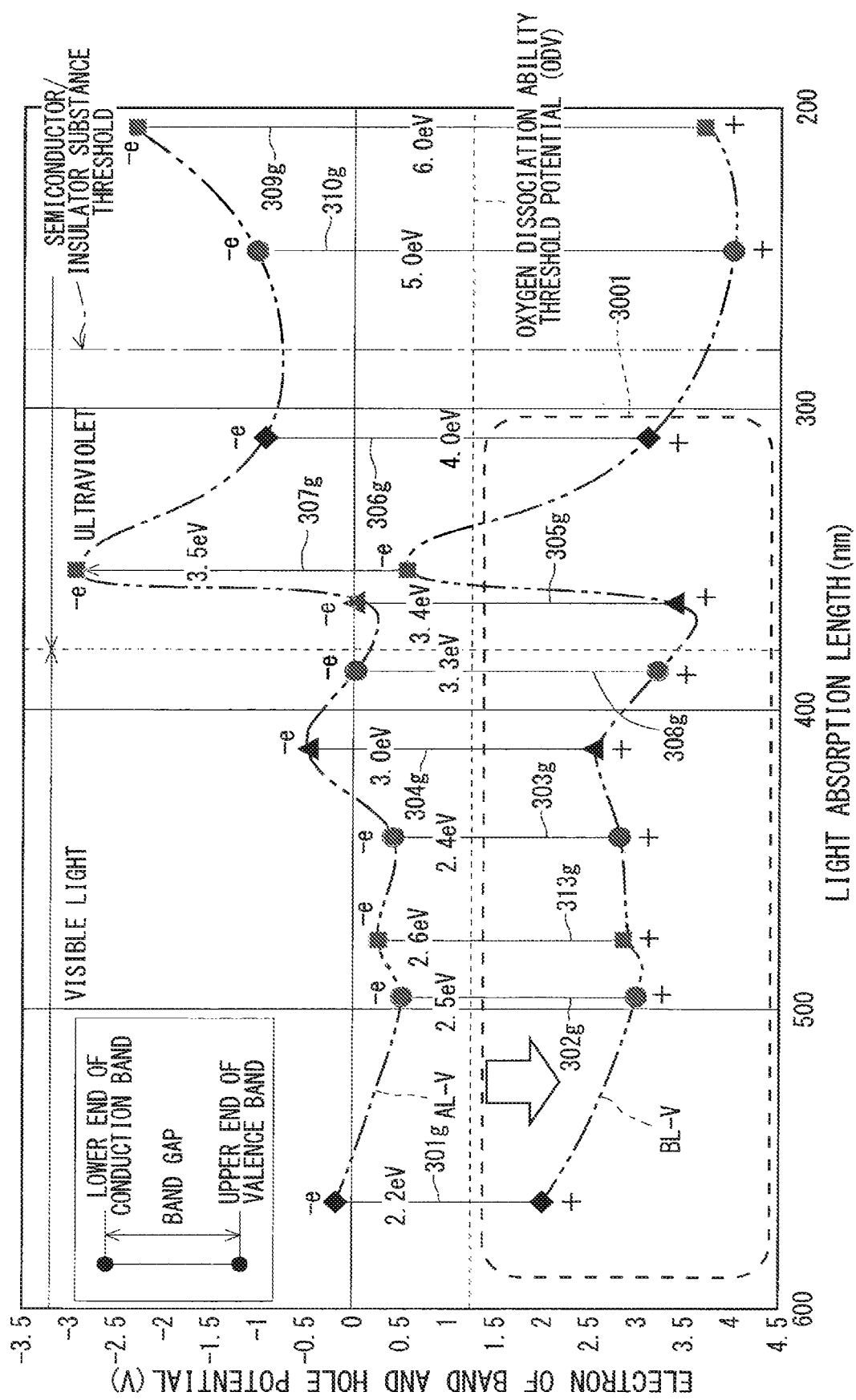
FIG. 5 is an explanatory view showing an excited state of a substance with respect to light absorption wavelength.

FIG. 5 is an explanatory view showing an excited state of a substance with respect to light absorption wavelength. Reference numerals 301g to 310g and 313g indicate a band gap and an excited state (photocatalytic state) of a metal compound having properties of an insulator from a semiconductor used for a discharge surface material in a metal compound layer 1d.

More specifically, reference numerals 301g to 310g and 313g represent chromium BO (band gap) 301g, tungsten BG 302g, vanadium BG 303g, molybdenum BG 304g, niobium BG 305g, tantalum BG 306g, nickel BG 307g, zinc BG 308g, yttrium BG 309g, zirconium BG 3102, and bismuth BG 313g. For example, vanadium BG 303g shows a band gap of a metal compound ($V_2O_5$) with vanadium as a main metal element.

In the figure, in a characteristic line AL-V, the potential of electrons in a valence band in the excited state of each substance is indicated by an envelope, and in a characteristic line BL-V, the potential of a +hole in a conduction band in the excited state of the substance is indicated by an envelope.

A high concentration ozone generatable range 3001 surrounded by a broken line frame shows the potential width of the +hole and a light absorption wavelength width range in the excited state of a substance capable of generating high concentration ozone and extracting high concentration ozone. The high concentration ozone generatable range 3001 shows a range in which an activated state is achieved by the discharge light energy of the dielectric barrier discharge generated in the discharge space, and a catalytical dissociation reaction of oxygen gas into oxygen atoms can be carried out on an activated substance surface.

FIG. 6 is an explanatory view showing ozone concentration characteristics that can be taken out with respect to injected discharge energy due to a difference in substance of a metal compound relating to main metal elements and having the semiconductor properties. FIG. 6 shows a chromium gradient characteristic 301a, a tungsten gradient characteristic 302a, a vanadium gradient characteristic 303a, a molybdenum gradient characteristic 304a, a niobium gradient characteristic 305a, a tantalum gradient characteristic 306a, a nickel gradient characteristic 307a, a zinc gradient characteristic 308a, a yttrium gradient characteristic 309a, and a zirconium gradient characteristic 310a. However, the vanadium gradient characteristic 303a indicates a characteristic almost overlapping with a bismuth gradient characteristic 313a, and the tantalum gradient characteristic 306a overlaps with the niobium gradient characteristic 305a; therefore, some illustration is omitted in FIG. 6. For example, the molybdenum gradient characteristic 304a indicates a gradient characteristic of a metal compound ($MoO_3$) with molybdenum as a main metal element.

FIG. 6 further shows a chromium concentration characteristic 301b, a tungsten concentration characteristic 302b, a vanadium concentration characteristic 303b, a molybdenum concentration characteristic 304b, a niobium concentration characteristic 305b, a tantalum concentration characteristic 306b, a nickel concentration characteristic 307b, a zinc concentration characteristic 308b, a yttrium concentration characteristic 309b, and a zirconium concentration characteristic 310b. For example, the molybdenum concentration characteristic 304b indicates a concentration characteristic of the metal compound ($MoO_3$) with molybdenum as a main metal element.

In FIG. 6, a high concentration ozone threshold HCT defined in the present invention is also shown. As the high concentration ozone threshold HCT, for example, approximately 200 $g/m^3$ can be considered. A high concentration ozone generatable range 2001 shows a range in which a high concentration ozone gas can be taken out.

The gradient characteristics 301a to 310a described above indicate tangents of ozone characteristics in a low concentration range of the ozone concentration characteristics 301b to 310b. That is, each slope of the gradient characteristics 301a to 310a indicates an ozone generation amount per unit volume with respect to the discharge energy due to a difference in substance of the metal compound, that is, ozone generation efficiency η.

FIG. 7 is an explanatory diagram showing logarithmic representation of an ozone generation amount (g) with respect to the injected discharge energy (W/Q: specific power) per unit volume of a metal compound of a specific metal element (logarithmic representations of the tangent gradient characteristics 301a to 301c in FIG. 6 are shown). In this figure, as shown by the element concentration characteristics 301c to 310c and 313c, it has become obvious that there is shown a characteristic in which, even when the same discharge energy is injected, the amount of ozone that can be generated is significantly different depending on a difference in the substance of the metal compound. In addition, it has been confirmed that a degree of increase (Lc) of an ozone decomposition rate σ determined depending on an ozone decomposition characteristic in the ozone generator of FIG. 10 to be described later hardly changes due to the difference in substance of the metal compound, and it could be experimentally confirmed that an ozone decomposition degree produced by the substance of the metal compound did not change.

FIG. 7 shows, as the element concentration characteristics 301c to 310c and 313c, the chromium concentration characteristic 301c, the tungsten concentration characteristic 302c, the vanadium concentration characteristic 303c, the molybdenum concentration characteristic 304c, the niobium concentration characteristic 305c, the tantalum concentration characteristic 306c, the nickel concentration characteristic 307c, the zinc concentration characteristic 308c, the yttrium concentration characteristic 309c, the zirconium concentration characteristic 310c, and the bismuth concentration characteristic 313c.

In a characteristic group GA, a metal (element) compound having the ability to generate ozone of not less than 0.1 g per 1 cubic meter volume of gas with respect to the specific power W/Q is shown, and it could be confirmed from a characteristic diagram that it is possible to achieve the ozone generator 1 in which a high concentration ozone gas can be taken out by applying the metal compound layer 1d, formed of a metal compound substance of this characteristic group GA, to discharge surfaces of the ground electrode 1b and the dielectric 1c.

In a characteristic group GB, a metal compound group having the ability to generate ozone of approximately 0.001 g which is two orders of magnitude lower than the characteristic group GA is shown, and owing to the low ozone generation ability, high concentration ozone has not been generated, and, as a result, it was demonstrated by a demonstration test that high concentration ozone could not be taken out.

In a characteristic group GC, a metal compound group capable of generating only ozone of 0.00001 g which is four orders of magnitude lower than the characteristic group GA is shown, and owing to the low ozone generation ability, high concentration ozone has not been generated, so that it was shown that high concentration ozone could not be taken out, and, at the same time, a surprising fact that only ozone of a concentration lower than the ozone generation ability of the characteristic group GB could be generated was revealed.

FIG. 8 is an explanatory view summarizing, in a table format, physical properties of an oxide metal material in the ozone generator 1 in which the metal compound layer 1d formed of a metal compound having specific semiconductor properties in the present embodiment is fixed to the discharge surfaces of the ground electrode 1b and the dielectric 1c and a relationship between the ozone generation efficiency η and a maximum ozone generation concentration Cmax.

In FIG. 8, material product numbers 301 to 306 (chromium, tungsten, vanadium, molybdenum, niobium and tantalum) correspond to the characteristic numbers and the product numbers of the metal compound substances shown in FIGS. 6 and 7, represent elemental metal materials of metal compounds capable of generating high concentration ozone, and are metal oxide compounds corresponding to element metals of Groups 5 and 6 in the element periodic table, and in each of them, the ozone generation efficiency η at which high concentration ozone can be taken out and a taking-out ozone concentration value are shown. Bismuth with a material product number 313 also represents the elemental metal material of the metal compound capable of generating high concentration ozone. Although the excited state of bismuth belongs to the high concentration ozone generatable range 3001 as shown in FIG. 5, bismuth is a metal oxide compound of an element which is not a metal element of Group 5 or 6 in the element periodic table.

In addition, nickel 307 is a representative example of a metal compound that undergoes a remarkable decomposition/dissociation reaction through catalytic reaction of ozone gas itself when comes into contact with ozone. In the case of nickel 307, the ozone generation efficiency η and the taking-out ozone concentration value in nickel oxide NiO are shown. In the measurement of the ozone generation efficiency η, only 2.78 E-6 (mg/J) (0.01 g/kWh) could be obtained, the maximum ozone concentration Cmax that could be taken out was only 0.2 ($g/m^3$), and it was shown that the material was a material not only having no ozone generation ability at all but also decomposing even low concentration ozone, generated from oxygen atoms dissociated by collision of high-speed electrons of discharge plasma with oxygen, in the ozone generator.

Although zinc 308 was a metal compound whose band gap value and hole potential satisfied promising conditions for enhancing the ozone generation ability, in the measurement of the ozone generation efficiency η, only 9.49E-5 (mg/J) (0.34 g/kWh) can be obtained, and only several $g/m^3$ of the maximum ozone concentration Cmax that can be taken out is obtained. It was shown that zinc BG 308 with the material product number 308 was also a substance having no ability to generate high concentration ozone.

Examining the metal compound of zinc 308 (zinc oxide ZnO) in detail, this metal compound corresponds to a transparent conductive film substance through which discharge light of visible light transmits in particular, for visible discharge light energy, the material is a material which is transmitted and reflected and escapes, and it has been found that the material does not effectively absorb the discharge light energy and cannot excite the metal compound into a photocatalytic state. In other words, although this material has physical properties equivalent to semiconductors, it has been found that the material is a special metal compound having properties of an insulating material in terms of its characteristics. Thus, it is judged that ozone of several $g/m^3$ taken out from the generator corresponds to low concentration ozone generated from oxygen atoms dissociated by collision between high-speed electrons of discharge plasma and oxygen.

Yttrium 309, zirconium 310, and aluminum 311 respectively corresponding to the material product numbers 309 to 311 represent metal compounds whose band gap value is not less than 5 eV. In yttrium 309 and zirconium 310, in the measurement of the ozone generation efficiency η, only 1.59E-4 (mg/J) (0.57 g/kWh) and 9.49E-5 (mg/J) (0.34 g/kWh) can be obtained, only several $g/m^3$ of the maximum ozone concentration Cmax that can be taken out is obtained. It has been found that the materials have no ability to generate high concentration ozone. Also in the materials, as described above, it is determined that ozone of several $g/m^3$ taken out from the generator corresponds to low concentration ozone generated from oxygen atoms dissociated by collision between high-speed electrons of discharge plasma and oxygen.

Even in aluminum 311 and silicon 312, the band gap value of the metal compound is not less than 7 eV, and as evident from Patent Document 1 and the like as the prior art, only several $g/m^3$ of the taking-out ozone concentration value in high purity oxygen gas can be obtained.

These metal compounds correspond to metal compounds which cannot perform absorption at all with respect to a wavelength of light emitted by the dielectric barrier discharge, and the compounds correspond to an insulator.

Figure 9:
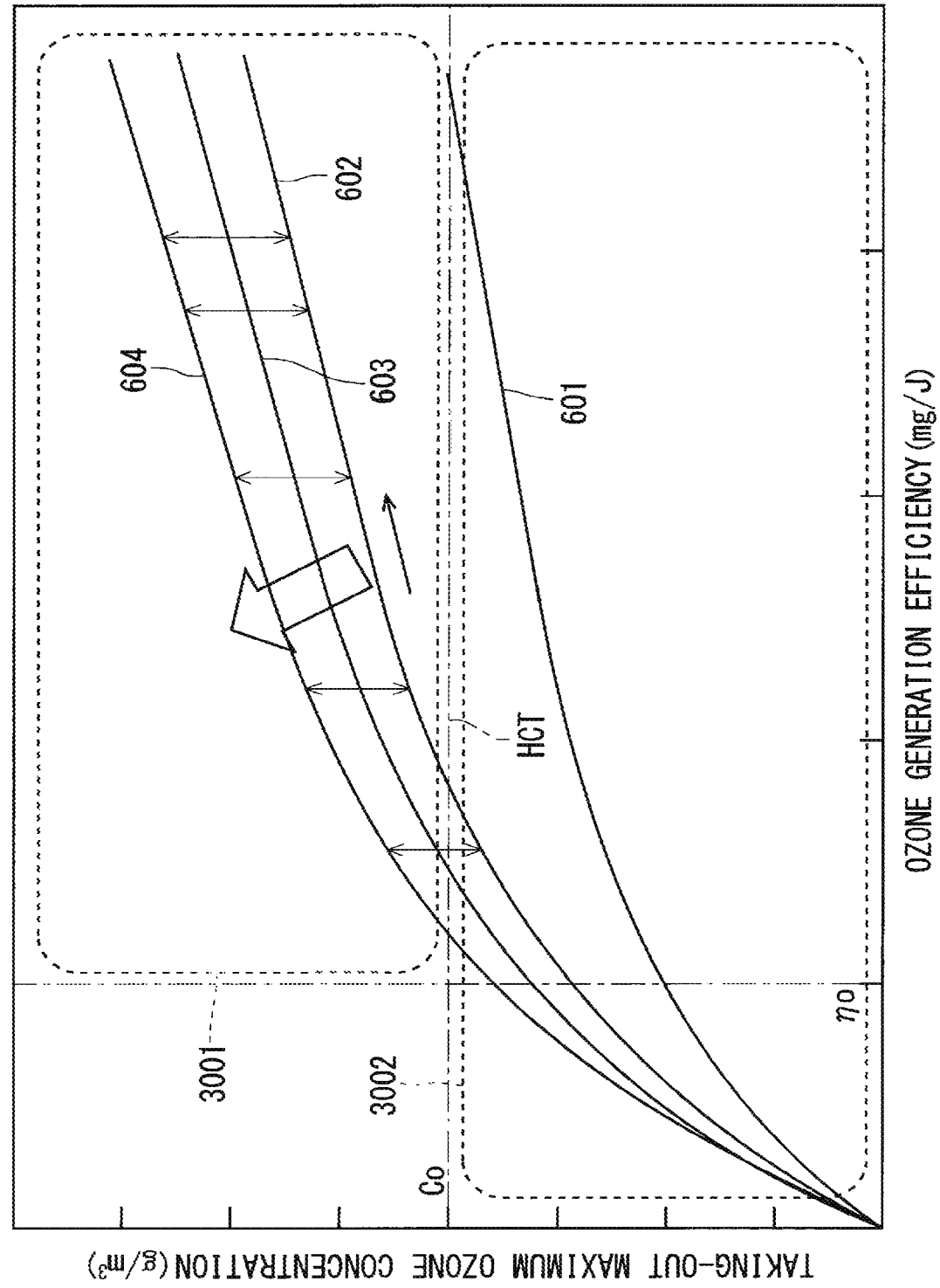
FIG. 9 is an explanatory view showing a maximum ozone concentration value Cmax that can be taken out with respect to the ozone generation efficiency η in a device in which a predetermined discharge electric power is supplied to the ozone generator used in the present embodiment.

FIG. 9 is an explanatory view showing a maximum ozone concentration value Cmax value that can be taken out with respect to the ozone generation efficiency η in a device in which a predetermined discharge power W is supplied to the ozone generator 1 used in the present embodiment. A concentration Co represents a threshold value of a high concentration ozone concentration. In addition, ηo represents minimum ozone generation efficiency for obtaining high concentration ozone not less than the threshold value.

Maximum ozone concentration characteristics 601 to 604 represent maximum ozone concentration characteristics that can be taken out with respect to the ozone generation efficiency η in the ozone generator 1 shown in FIG. 1, and the maximum ozone concentration characteristics 601, 602, 603, and 604 represent characteristics when the temperature of the discharge surface of the ozone generator 1 is lowered to 40° C., 20° C., 0° C., and −20° C. and kept constant.

As shown in FIG. 9, even if the metal compound having a constant ozone generation efficiency η is fixed to the discharge surface, if the temperature (of electrodes 1*a* and 1*b*) of the ozone generator is lowered to from 20° C. or less, the ozone concentration that can be taken out from the ozone generator 1 increases, and higher concentration ozone can be taken out. This indicates that the amount of ozone generated in the ozone generator 1 cools gas to suppress the ozone decomposition rate, so that high concentration ozone can be taken out. That is, when the discharge surface temperature exceeds 20° C., since a gas temperature in the discharge space increases, almost all the amount of ozone generated in the ozone generator 1 accelerates an ozone decomposition reaction at the gas temperature, and as a result, high concentration ozone cannot be taken out.

Here, a surprising fact is that in high-density discharge plasma generated by the ozone generator, if an ozone generation catalytic function on an electrode surface and the like cannot be exerted, the generated ozone functions as a function of decomposing ozone gas by the discharge plasma, and this technique is different from the ozone generation technique that has been prevailed.

The high concentration ozone generatable range 3001 indicates a range from which high concentration ozone can be taken out, and it is found that an ozone generation efficiency range and a suppression range of the ozone decomposition rate, from which the high concentration ozone can be obtained, are defined from the high concentration ozone generatable range 3001.

That is, even if the metal compound layer 1*d* formed of a metal compound having high ozone generation efficiency is fixed to the discharge surface, as the ozone decomposition rate increases, high concentration ozone cannot be taken out as a result. In the present embodiment, when the cooling temperature of the discharge surface, that is, the electrode cooling temperature of the electrodes 1*a* and 1*b* is set to a high temperature exceeding 20° C., an ozone decomposition amount increases, and a high concentration ozone generation impossible range 3002 is obtained as in the maximum ozone concentration characteristic 601, so that high concentration ozone is not taken out. As described above, the temperature setting for the electrodes 1*a* and 1*b* is largely related to an ozone decomposition suppression requirement.

In FIG. 9, measurement data on the ozone decomposition amount due to the gas temperature in the ozone generator 1 is shown; however, as factors causing ozone decomposition before taking out the amount of ozone generated in the ozone generator 1, a specific power amount W/Q value injected into the discharge space, a gas pressure P in a discharge gas space, and a discharge gap length d in the discharge space are considered other than the gas temperature (the set temperature of 1*a* and 1*b*).

That is, the ozone decomposition amount increases depending on the structure or setting conditions of the ozone generator 1 including the specific power amount W/Q value (W·min/L) injected into the ozone generator 1, the gas pressure P value (MPa), and the discharge gap length d value (mm), so that high concentration ozone cannot be taken out. Accordingly, these factors (the specific power amount W/Q value (W·min/L), the gas pressure P value (MPa), and the discharge gap length d value (mm)) are largely related to the ozone decomposition suppression requirement.

Although the specific power amount W/Q value to be injected has a property of enhancing the ozone generation ability, if the specific power amount W/Q value becomes too large, it also becomes a factor of raising the gas temperature, so that in order to take out high concentration ozone, it is necessary to set the W/Q value within an optimal range (Wm/Qm). As the optimum specific power Wm/Qm, it has been found that high concentration ozone gas can be taken out by setting the specific power amount W/Q value from 300 (W·min/L) to 500 (W·min/L) from a measured value.

The gas pressure P value (MPa) and the discharge gap length d value (mm) depend on a discharge space volume V. When the discharge space volume V is too large, a time t (sec) (t is proportional to V/Q) passing through the discharge space becomes longer, so that the time during which the ozone gas generated by the generator is exposed to the discharge plasma becomes longer. As a result, the ozone decomposition amount of generated ozone amount also increases, so that high concentration ozone cannot be taken out. Thus, in order to take out the high concentration ozone, it is necessary to set within an optimum gas pressure range Pm value (MPa) and the optimum gap length range dm value (mm).

As a gap length of the discharge space of the ozone generator becomes shorter so as to be not more than 0.4 mm, the electric field strength of the discharge plasma becomes higher, the effect that strong excitation light (discharge light) can be applied to the metal compound applied onto the discharge surface is produced, and, at the same time, the discharge space is cooled from the discharge surface; therefore, the effect of reducing a temperature of passing gas and the discharge space volume V described above are reduced, so that the effect of shortening the time t passing through the discharge space is synergized, whereby the ozone concentration that can be taken out is increased. However, if the discharge gap is reduced to less than 0.02 mm, the wall of the discharge surface increases the factor of decomposing the generated ozone, and therefore, in the result of a demonstration test, it was demonstrated that in the ozone generator of the present invention, an optimum range of the gap length of the discharge space was within a range of 0.02 to 0.12 (mm).

The effect on the gas pressure in the discharge space is similar to the effect of the gap length described above, and in the result of a demonstration test, in the ozone generator of the present invention, it is desirable that the gas pressure is set within a range of 0.2 to 0.4 (MPa) as an absolute pressure. In the case of the gas pressure, the lower the pressure, the worse the cooling effect of gas, and decomposition loss to the wall tends to increase.

That is, it has been found that the optimum gas pressure range Pm (MPa) is within a range of 0.2 MPa to 0.4 MPa, and when the optimum gap length range dm value (mm) is set within a range of 0.02 mm to 0.12 mm, the ozone decomposition rate in the ozone generator 1 is suppressed with respect to the amount of generated ozone, so that a high concentration ozone gas can be taken out.

Figure 10:
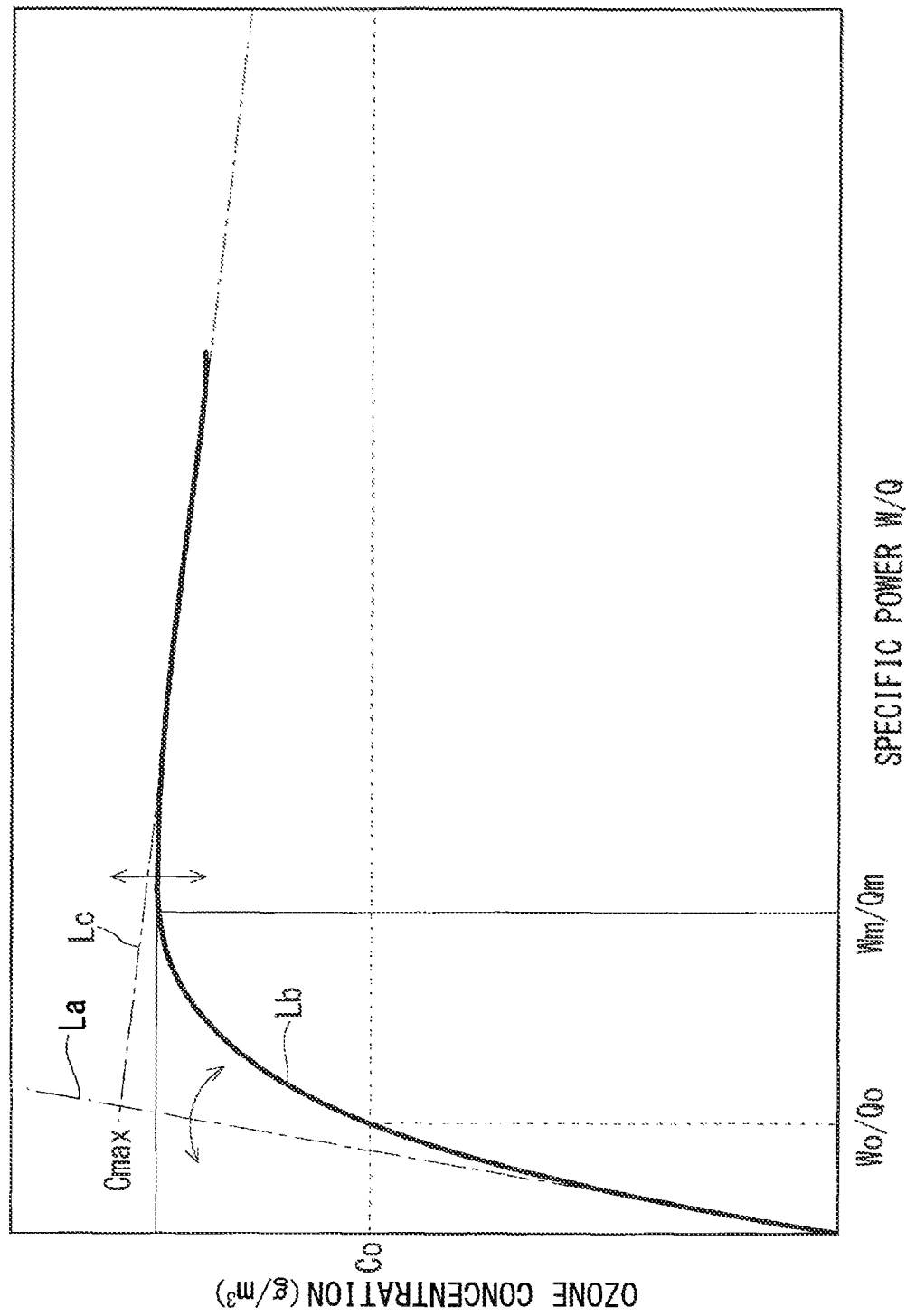
FIG. 10 is an explanatory view showing the ozone concentration characteristic that can be taken out in the ozone generator used in the present embodiment.

FIG. 10 is an explanatory view showing the ozone concentration characteristic (b) that can be taken out in the ozone generator 1 shown in FIG. 1.

FIG. 10 shows a diagram in which an ozone generation phenomenon occurring in the ozone generator and a decomposition phenomenon of generated ozone are logically elucidated from a general ozone concentration characteristic of the ozone generator.

That is, in the characteristic of FIG. 10, a tangent La indicates a tangent when the specific power amount W/Q value of an ozone concentration characteristic line Lb is small. The tangential La indicates that the amount of generated ozone increases in proportion to the specific power amount W/Q value and represents the ozone generation characteristic of the metal compound itself having the ozone concentration characteristic line Lb, and inclination of the tangent La indicates an ozone generation efficiency η value.

A tangent Lc indicates an asymptotic line (ozone decomposition characteristic) of attenuation of the ozone concentration with respect to the specific power amount W/Q value of the ozone concentration characteristic line Lb, and the ozone decomposition rate σ (%) with respect to the specific power amount W/Q value is expressed by the following formula (1). In the formula (1), a taken-out ozone amount TWQ represents a taken-out ozone amount at the specific power W/Q, and a generated ozone amount GWQ represents a generated ozone amount at the specific power W/Q.

[Formula 1]

$$\sigma = [1 - TWQ/GWQ] \times 100 (\%) \quad (1)$$

Inclination of the tangent Lc which is the asymptotic line indicates a degree of decrease of the ozone concentration that can be taken out by the increase of the ozone decomposition rate a of the ozone generated by the ozone generator 1 itself.

The ozone concentration characteristic line Lb that can be taken out is determined by combining the tangent La defining the ozone generation efficiency η and the tangent Lc showing decrease degree characteristics of the ozone concentration that can be taken out. That is, in a maximum ozone concentration Cmax value that can be taken out, higher concentration ozone can be taken out as the inclination of the tangent La (ozone generation efficiency η) is larger, and, on the other hand, higher concentration ozone can be taken out as the inclination of the tangent Lc is smaller.

Accordingly, as seen from the characteristic diagram shown in FIG. 10, in order to take out the high concentration ozone gas from the ozone generator 1, it is necessary that the ozone generation efficiency η is high, and in addition, it is necessary to provide the structure or setting means of the ozone generator 1 in order to satisfy the ozone decomposition suppression requirement for suppressing the ozone decomposition rate of the ozone gas generated in the ozone generator 1 as much as possible.

Figure 11:
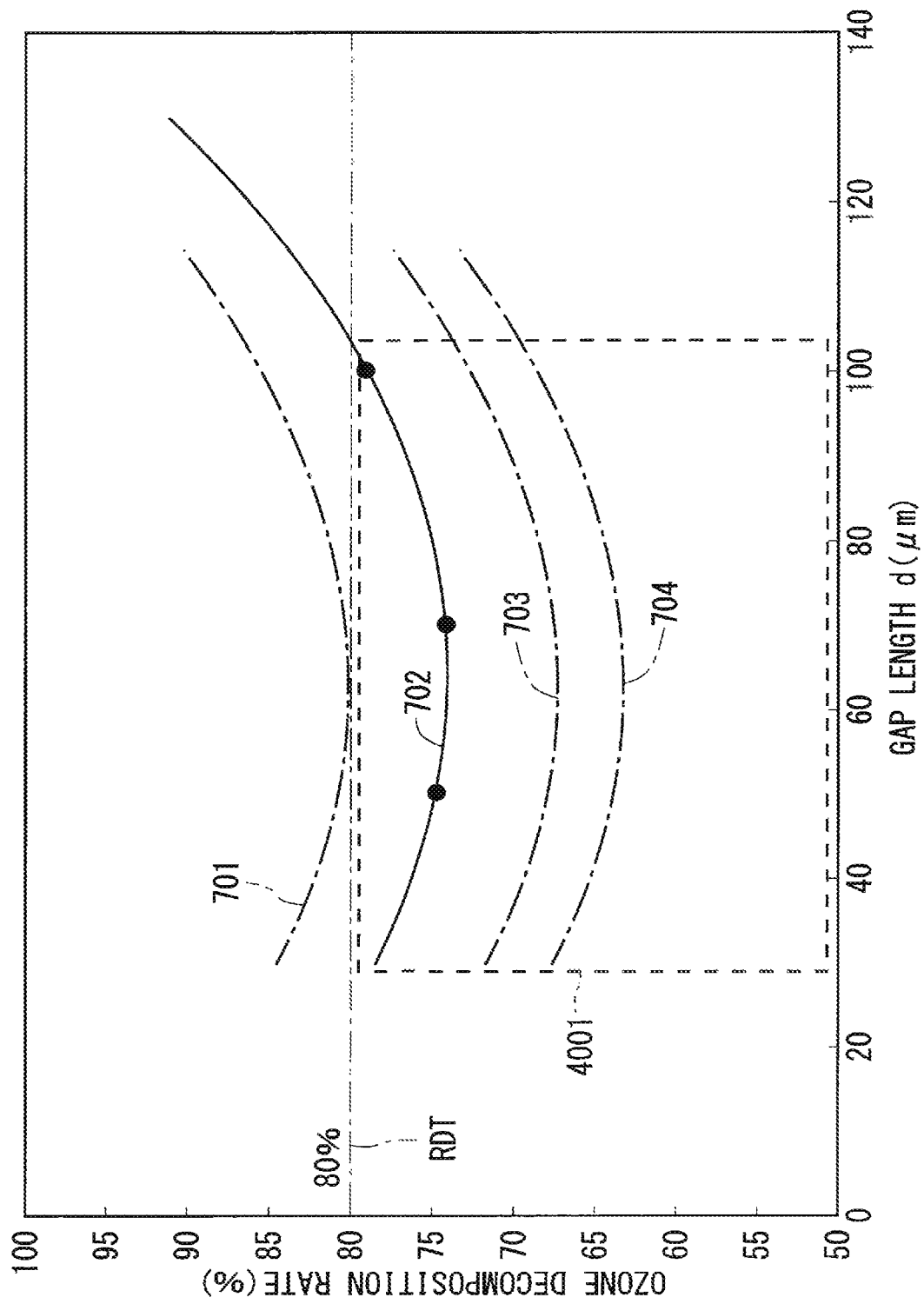
FIG. 11 is a graph showing a relationship between a discharge gap length and an ozone decomposition rate in the ozone generator used in the present embodiment.

FIG. 11 is a graph showing a relationship between the discharge gap length d and the ozone decomposition rate in the ozone generator 1 of the present embodiment shown in FIG. 1. In FIG. 11, the gas pressure in the ozone generator 1 is set to a predetermined pressure, and when ozone is generated with a specific power value (W/Q value) determined when a predetermined gas flow rate Q and a predetermined injection electric power W are supplied, the discharge gap length d (the distance between the metal compound layers 1d and 1d facing each other) of the ozone generator 1 and an electrode cooling temperature T of the electrodes 1a and 1b are varied, and characteristics of the ozone decomposition rate a with respect to the discharge gap length d in the ozone generator 1 itself estimated from the amount of ozone generated in the ozone generator 1 are shown.

FIG. 11 shows a dependence of the ozone decomposition rate a on the discharge gap length d when the electrode cooling temperature T is kept constant for each of characteristic curves 701 to 704.

The characteristic curve 701 shows the dependence of the ozone decomposition rate a on the discharge gap length d when the electrode cooling temperature T is kept constant at 40° C., the characteristic curve 702 shows the dependence when the electrode cooling temperature T is kept constant at 20° C., the characteristic curve 703 shows the dependence when the electrode cooling temperature T is kept constant at 0° C., and the characteristic curve 704 shows the dependence when the electrode cooling temperature T is kept constant at −20° C.

As a threshold value of the ozone decomposition rate a (one-dot chain line), it is about 80%, and there is exhibited a limit value at which as the ozone decomposition rate increases from the threshold value, even if a lot of ozone is generated in the ozone generator 1, since the ozone decomposition rate is high, the ozone concentration that can be taken out cannot be made high.

Accordingly, as shown in FIG. 11, a high concentration ozone extraction range 4001 is a condition range in which high concentration ozone is easily taken out in the ozone generator 1. In other words, the discharge gap length d is preferably 20 μm to 120 μm (0.02 to 0.12 (mm)), and the electrode cooling temperature T is preferably not more than 20° C.

(Ozone Generator)

Hereinafter, referring to FIG. 1, description will be given of the action and operation of the (nitrogen-free) ozone generator 1 and discharge energy injection, description will be given of the ozone generation efficiency and the ozone decomposition rate in the ozone generator 1, and theoretical description will be given of the ozone concentration that can be taken out from the ozone generator 1.

In FIG. 1, a raw material supply system 99 for supplying oxygen (raw material gas) having a purity of not less than 99.99(%) is constituted of a high purity oxygen cylinder 991, a pressure reducing valve 992, and an on-off valve 993, and supplies oxygen gas 994 to the outside. Then, the oxygen gas 994 is supplied as a raw material gas 995 to the ozone generator 1 via MFC3.

The ozone generator 1 includes the high voltage electrode 1a (first electrode), the ground electrode 1b (second electrode), the dielectric 1c and the metal compound layer 1d. The pair of electrodes 1a and 1b face each other, and the dielectric 1c is provided on an opposing surface (discharge surface) of the high voltage electrode 1a. The metal (element) compound layer 1d is applied onto each of opposing surfaces (discharge surfaces) facing each other between the dielectric 1c and the ground electrode 1b. That is, the metal compound layer 1d is provided on each surface of the dielectric 1c and the ground electrode 1b.

Accordingly, a space formed between the dielectric 1c and the ground electrode 1b with the metal compound layer 1d interposed therebetween serves as the discharge space, and a distance between the metal compound layers 1d facing each other serves as the discharge gap length d. By inducing dielectric barrier discharge in this discharge space, a portion of the oxygen gas passing through the discharge space can be converted into ozone gas and taken out as ozonized oxygen gas to the outside.

FIG. 1 schematically shows the configuration of the ozone generator 1, and in an actual ozone generator, a flow of gas supplied to the ozone generator is hermetically sealed from a container space of the ozone generator 1. As described above, the metal compound layer 1d is fixed to each of the opposing surfaces (discharge surfaces) between the dielectric 1c and the ground electrode 1b, and the raw material gas 995 flows in along the opposing surface (discharge surface) between the dielectric 1c and the ground electrode 1b from the left side of the figure, can be taken out as an ozonized oxygen gas 996 from an outlet on the right side via APC (automatic pressure regulator) 4, and ozone gas (ozonized oxygen gas 996) is supplied to an ozone treatment chamber 12.

An ozone power supply 2, which is an alternating high voltage power supply, is mainly constituted of a rectifier circuit 2a, an inverter circuit 2b, and a high voltage transformer 2c. As the output voltage of the ozone power supply 2, an alternating high voltage is applied between the high voltage electrode 1a and the ground electrode 1b of the ozone generator 1 of FIG. 1.

When the alternating high voltage is applied between the high voltage electrode 1a and the ground electrode 1b, electric charge is charged on the entire surface of the dielectric 1c, and when the electric charge equal to or larger than a certain amount is charged, the discharge space is partially dielectric broken to cause dielectric barrier discharge to release the charged electric charge. This dielectric barrier discharge has an extremely short lifetime and is on the order of nanoseconds, is a high electric field discharge, and is an intermittent discharge of uniform and approximately innumerable nanoseconds across the entire surface of the dielectric 1c. Thus, the dielectric barrier discharge becomes discharge uniformly giving high energy to oxygen gas, and as discharge electron energy, the dielectric barrier discharge becomes a discharge having approximately 2 eV to 4 eV, and as light is emitted by collision of the high energy electron and gas, discharge having approximately ultraviolet light (300 nm) to visible light (600 nm) is obtained.

Ozone gas is generated in the ozone generator 1 by receiving the energy of the dielectric barrier discharge uniformly spreading on the discharge surface, and an ozone amount obtained by subtracting the ozone decomposition amount, multiplying the ozone decomposition rate a attributable to a discharge gas temperature, from the amount of the generated ozone is regarded as an ozone gas taking-out concentration, and the ozonized oxygen gas 996 can be taken out from the ozone generator 1.

Considering high concentration ozone of not less than 200 ($g/m^3$ (93333 ppm)) as the ozone concentration that can be taken out from the ozone generator 1, as high concentration ozone of not less than 200 ($g/m^3$), the number of ozone molecules per 1 mole (22.4 L) corresponds to not less than $0.562 \times 10^{23}$ pieces/mol ($2.51 \times 10^{18}$ pieces/$cm^3$). In order to generate such an amount of ozone molecules, considering that the amount of annihilation of oxygen atoms is large in the ozone generator because the lifetime of the oxygen atoms is short, oxygen atoms of not less than $0.562 \times 10^{23}$ pieces/mol ($2.51 \times 10^{18}$ pieces/$cm^3$) (at least about several ten times the number of ozone molecules) is required to be generated.

Usually, in discharge plasma, oxygen is dissociated into atoms by collision of ionized high-speed electrons, thus generating ozone. However, since the electron density of the discharge plasma is usually approximately $10^{10}$ cells/$cm^3$, when the number of oxygen atoms generated only by electron collision in the plasma is approximated, even if the electrons themselves with electron densities in the plasma repeat the collision from several millions of times to tens of millions of times while accelerating in an avalanche manner in the plasma, the electron density is approximately $10^{15}$ to $10^{16}$ pieces/$cm^3$.

The discharge plasma in the ozone generator is very large as compared to the electron density and gas density of the ozone layer on the earth, a mean free process distance of the gas is very short, and the discharge plasma tends to collide with ozone, other electrons, and gas particles and is in a state in which ozone generated much more than the ozone layer by these collisions is decomposed by collision with electrons. In the ozone layer, there is no wall called the discharge surface like the ozone generator, and it is unnecessary to consider a decomposing element due to collision of generated ozone with the wall; however, in the ozone generator, since the discharge space is a discharge wall with a short gap, the ozone decomposition amount by collision with this wall portion becomes very large.

Accordingly, the number of ozone molecules generated from the obtained oxygen atoms is approximately $10^{15}$ to $10^{16}$ pieces/$cm^3$, and its ozone concentration is approximately 1 ($g/m^3$) to 10 ($g/m^3$ (several hundred ppm to several thousands ppm)). Thus, it can be seen that the concentration of ozone generated only by the electron density in the discharge plasma is a concentration that does not possibly come close to high concentration ozone of not less than 200 ($g/m^3$ (93333 ppm)).

In actual experiments, when an ozone generator in which a specific metal compound is not attached to the discharge surface is used, and high-purity oxygen is supplied to the ozone generator to induce dielectric barrier discharge and thus to generate ozone, ozone is little generated, and at most approximately several tens $g/m^3$ (several thousands ppm) of ozone is generated. With respect to consideration for the ozone concentration that can be generated by the electron collision of the electron density of the discharge plasma described above, the ozone concentration obtained by an actual experimental result matches consideration for the amount of ozone generated only by the electron itself in the discharge plasma by an ozone generation mechanism by the electron collision described above.

Next, ozone concentration characteristics that can be taken out with respect to plasma energy injected into the ozone generator 1 will be considered. The ozone concentration described here is not ozone concentration of approximately several tens $g/m^3$ (several thousands ppm) that can be generated by electron avalanche collisions of the electron density of the discharge plasma, and ozone of high concentration of not less than 200 $g/m^3$ can be generated. Consideration for an ozone generating method in which the generated ozone can be taken out as high concentration ozone will be described.

The ozone concentration characteristic shows the characteristics as shown in FIG. 10. FIG. 10 shows standard ozone characteristics showing the ozone concentration characteristics that can be taken out in the ozone generator 1 of FIG. 1, and shows the ozone concentration characteristic line Lb that can be taken out with respect to the specific power W/Q (W·min/L) (horizontal axis) that is a specific discharge power amount per the unit gas flow rate Q. In the ozone generator 1, the ozone concentration characteristic line Lb that can be taken out generally reaches the maximum concentration Cmax at the optimum specific power Wm/Qm and shows the characteristic that the ozone concentration that can be taken out decreases when the optimum specific power Wm/Qm is exceeded.

When analyzing the ozone concentration characteristic line Lb, it is a composite characteristic of the tangent La and the tangent Lc (decrease degree of ozone concentration that can be taken out). The characteristic indicated by the tangent La shows an ozone generation amount proportional to the discharge power amount W/Q per unit gas flow rate, and the inclination of the tangent La shows the ozone generation efficiency η (mg/J).

The tangent Lc indicates an amount by which the ozone concentration that can be taken out by decomposition of ozone generated in the ozone generator 1 attenuates. The ozone attenuation amount is determined by the structure and gas conditions of the ozone generator 1 itself, and the value of the tangent Lc indicates a degree of increase in the ozone decomposition rate σ (mg/J). In other words, the lower the value of the tangent Lc, the larger the ozone decomposition amount in the ozone generator. Since the degree of increase in the ozone decomposition rate σ (an attenuation tangent characteristic indicated by the tangent Lc) is uniquely determined by the structure and gas conditions of the ozone generator 1 itself, in order to obtain a high concentration as the ozone concentration that can be taken out, the ozone generator 1 in which the ozone generation efficiency η (mg/J) is high (inclination of the characteristic indicated by the tangent La is large) is desirable, and on the contrary, it is necessary to set the condition of the ozone generator 1 in which the ozone decomposition rate σ becomes small.

In FIG. 10, a characteristic value Co shows a critical concentration value of 200 $g/m^3$ (93333 ppm) as an example of defining a high concentration of ozone concentration in the present embodiment.

In the present invention, the first feature is to specify a metal element range of a discharge surface material substance having a high ozone generation efficiency η (mg/J) as a constituent material of the metal compound layer 1d.

The second feature of the present invention is to specify a crystal structure of the discharge surface material substance to be applied as the metal compound layer 1d and a particle size range of an adhesion material and is to make it possible to take out high concentration ozone gas of not less than 200 $g/m^3$ (93333 ppm) with a higher flow rate.

In addition, the third feature is to specify the setting conditions and structure of the ozone generator 1 itself and to specify the structure or setting means of the ozone generator 1 so that the amount of ozone that can be taken out from the ozone generator 1 can be increased by suppressing the ozone decomposition rate σ of the ozone generated by the ozone generator 1 and high concentration can be achieved. That is, the present invention has the first and second features to enhance the ozone generation efficiency η and the third feature to impose various ozone decomposition suppression requirements on the ozone generator 1 in order to suppress the ozone attenuation rate σ.

(Discharge Surface Material Used as Metal Compound Layer 1d)

First, many metal element substances shown in the periodic table were applied, as the metal compound layer 1d, onto the entire surface of the discharge surface (the surfaces of the ground electrode 1b and the dielectric 1c) of the ozone generator 1 supplied with high-purity oxygen gas 994 having a purity of not less than 99.99(%) at a high flow rate of not less than 3 L/min, and the ozone concentration that can be taken out was measured. As a result, in a state in which the material of the metal compound layer 1d applied onto the entire surface of the discharge surface is a conductive material such as metal, the maximum ozone concentration that can be taken out is not more than 100 $g/m^3$ for any metal element substance, and high concentration ozone of not less than 200 $g/m^3$ could not be taken out.

However, depending on the metal element substance applied as the metal compound layer 1d, if the dielectric barrier discharge is continued continuously, the entire surface of the discharge surface of the applied metal element substance is reformed to a dielectric (oxidized compound as a metal compound), and catalytic oxygen dissociation is carried out by the metal element substance of the modified metal compound, so that a very high concentration ozone can be generated in the ozone generator 1, and as a result, it was found that it is possible to take out high concentration ozone in which the maximum ozone concentration that could be taken out was not less than 200 $g/m^3$.

Examining the modified metal compound on the entire surface of this discharge surface, any metal compound is a dielectric with electrostatic capacitance, and examining this dielectric in more detail, it was found that the dielectric was a dielectric of the metal compound having semiconductor properties.

In the present invention, there will be explained the ozone generating method in which even at high flow rate and with high purity oxygen gas, high concentration ozone can be generated in the ozone generator 1, and the structure or setting means of the ozone generator 1 are specified such that the ozone decomposition rate is reduced to as low as possible with respect to the amount of ozone generated to impose ozone decomposition suppression requirements, so that high concentration ozone can be taken out.

FIG. 2 is an element periodic table describing metal elements and metal oxide compounds which are metal compounds thereof. In the element periodic table shown in FIG. 2, it was experimentally confirmed that a metal element range capable of generating high concentration ozone gas of not less than 200 g/m$^3$ in the ozone generator 1 shown in FIG. 1 and taking out the ozone gas and capable of realizing the metal compound having semiconductor properties was a metal element belonging to the first metal compound species 201.

It was confirmed from a test that the first metal compound species 201 is a metal compound ($V_2O_5$, $CrO_3$, $NbO_5$, $MoO_3$, $Ta_2O_5$, $WO_3$) containing metal elements V (vanadium), Cr (chromium), Nb (niobium), Mo (molybdenum), Ta (tantalum), and W (tungsten) of Groups 5 and 6 in the periodic table and having semiconductor properties.

In the periodic table, it was also confirmed that high concentration ozone gas of not less than 200 g/m$^3$ could be taken out with a metal compound ($Bi_2O3_3$) of a bismuth element other than Groups 5 and 6.

It was confirmed from a test that in the ozone generator 1 in which a metal compound containing Ni, Zn, Y, Zr, Al, and Si and having semiconductor properties is applied as the metal compound layer 1d, in any case, only an ozone concentration of not more than 20 g/m$^3$ could be taken out. As metal compounds containing Ni, Zn, Y, and Zr and having semiconductor properties, NiO, ZnO, $Y_2O_3$, $ZrO_2$, $Al_2O_3$, (alumina), and $SiO_2$ (quartz glass) materials were adopted.

The Ni element belongs to a metal compound substance having catalytic decomposing action of generally known ozone, and as metal compound substances having the catalytic decomposing action of ozone other than Ni element, there are Mn type, Co type, Cu type, and Ag metal compound substances.

These metal compounds having the ozone catalytic decomposing action tend to easily enter in activated and excited states by merely receiving relatively low temperature thermal energy from the outside, and when ozone comes into contact with a substance surface in the excited state, an ozone catalytic decomposition substance having a very high catalytic decomposition reaction with respect to ozone gas is obtained. Accordingly, when these metal compounds having the ozone catalytic decomposing action are brought into contact with ozone gas, exothermic reaction occurs by ozone decomposition; therefore, the activated state (excited state) of the metal compound is further promoted by the heat generation, and the ozone gas is catalytically decomposed.

Accordingly, in the ozone generator 1 in which the metal compounds having the ozone catalytic decomposing action are fixed as the metal compound layer 1d to the discharge surface, since ozone generated in the ozone generator 1 catalytically decomposes the ozone, most ozone is decomposed and returned to oxygen gas by being in contact with this metal compound, and high concentration ozone cannot be taken out from the ozone generator 1.

In the ozone generator 1 in which a metal compound NiO having the ozone catalytic decomposing action and having the semiconductor properties is applied as the metal compound layer 1d, the ozone concentration that can actually be taken out is about not more than 5 g/m$^3$ (2300 ppm). Thus, it is interpreted that not only high concentration ozone gas cannot be taken out from the ozone generator 1, but even ozone concentration of several tens g/m$^3$ generated by discharge plasma is ozonolyzed, and the ozone concentration which can be taken out is not more than about 5 g/m$^3$ (2300 ppm).

In a case where the metal compounds $Y_2O_3$, $ZrO_2$, $Al_2O_3$, and $SiO_2$ having the semiconductor properties are applied as the metal compound layer 1d, the ozone concentration that can be taken out is about 2 g/m$^3$ (933 ppm) to not more than 20 g/m$^3$ (not more than 9333 ppm), and high concentration ozone gas cannot be taken out. The metal compounds $Al_2O_3$, $SiO_2$, $Y_2O_3$, and $ZrO_2$ having the semiconductor properties are dielectric insulators known for alumina ($Al_2O_3$), quartz glass ($SiO_2$), and the like. In the metal compounds having the semiconductor properties, since the band gap values are very high of approximately 7.8 eV, 7.0 eV, 6.0 eV, and 5.0 eV, in order to excite this material, vacuum ultraviolet light having a light wavelength of not more than 250 nm is necessary. However, a light wavelength range due to the dielectric barrier discharge is 300 nm to 600 nm, and even if the light energy of the discharge light is applied onto the discharge surface, it is difficult for the material to excite the applied metal compound to the photocatalytic state.

Although there are substances such as $Sc_2O_3$, $HfO_2$, $B_2O_3$, alumina ($Al_2O_3$), and quartz glass ($SiO_2$) as the metal compound having a large band gap and having the semiconductor properties, in any case, it is said that the band gap is not less than 6 eV. Since it is very difficult for the substances to be excited up to the photocatalytic state with the light energy due to the dielectric barrier discharge occurring in the ozone generator 1, in the substances, it cannot be expected that high ozone generation efficiency due to photocatalyst cannot be obtained.

Thus, in the metal compounds $Al_2O_3$, $SiO_2$, $Y_2O_3$, and $ZrO_2$ having the semiconductor properties, catalytic dissociation reaction to oxygen atoms in a photoexcited state in the present invention is hardly performed, and ozone is generated only by collisions of electrons due to discharge plasma; therefore, only very low ozone concentration can be obtained.

Further, the metal compound substance containing Zn element generally belongs to a transparent electrode material, and in the case of applying the metal compound ZnO having the semiconductor properties, since discharge light energy of visible light transmits, it is difficult to excite the applied metal compound substance to the photocatalytic state. Thus, the ozone generation efficiency was low, the ozone concentration that can be taken out is approximately about 6 g/m$^3$ (2800 ppm), and it has been found that high concentration ozone gas cannot be taken out. As the metal compound substance as a transparent electrode material other than the Zn element, there are Ga-based, Ge-based, Cd-based, In-based and Sn-based metal compounds. Although these metal compound substances are not more than 5 eV in terms of the band gap and belong to a band gap range of the semiconductor, these metal compound substances are chemically stable materials that cannot effectively absorb and activate the discharge light energy. Thus, these metal compound substances are not semiconductors but substances which can be said to be an insulator.

In the periodic table shown in FIG. 2, the first metal compound species 201 represents a metal element range of a metal compound having semiconductor properties capable of obtaining high concentration ozone gas in the present invention. That is, higher concentration ozone can be generated by using a metal compound, having the metal element belonging to the first metal compound species 201 as the main element, as the metal compound layer 1*d* in the ozone generator 1.

A second metal compound species 202 shows a material range of a metal compound having a property of a semiconductor having an ozone decomposition catalyst having a greater ability to decompose generated ozone than the ozone generation ability, and as a result shows a metal element from which high concentration ozone cannot be taken out.

The metal compound having a large ozone catalytic decomposing action is concentrated in the metal element near the N-orbital of an electron orbital of an outermost shell. In particular, in V and Cr elements in which a group of metal elements of the first metal compound species 201 capable of obtaining high concentration ozone and the second metal compound species 202 having a great ability to decompose ozone overlap with each other, the effects of both the ozone decomposition ability and the ozone generation ability (oxygen separation ability) by discharge coexist, and the ozone concentration that can be taken out is determined depending on which ability is greater. Even in an element of the metal element group of the first metal compound species 201 capable of obtaining high concentration ozone, the substance having a larger electron orbital of the outermost shell of the metal element has higher ozone generation efficiency and has a tendency that the ozone concentration that can be taken out increases.

A third metal compound species 203 shows a material range of a metal compound having a band gap exceeding 4 eV, and even in a metal compound of a metal element belonging to the third metal compound species 203, high concentration ozone cannot be taken out.

A fourth metal compound species 204 shows a material range of a metal compound having properties of a transparent electrode material, and shows a metal element from which high concentration ozone cannot be taken out even in a metal compound belonging to the fourth metal compound species 204.

A fifth metal compound species 205 is specified as a platinum-group substance, and it has been said that the metal oxide compounds belong to a unique metal compound having the conductivity relative to properties of a dielectric having the semiconductor properties. The substances have a low ability to activate the substances themselves upon receiving discharge light energy even if applied onto the discharge surface, and the ozone generation ability (oxygen separation ability) by discharge is in an extremely low range of a substance.

(Photochemical Reaction Between Discharge Light Energy and Discharge Surface Material)

Since the dielectric barrier discharge is discharge for applying an alternating high voltage to the discharge space formed between the discharge electrodes 1*a* and 1*b* with the dielectric 1*c* interposed therebetween in the ozone generator 1, the discharge is a spark discharge that discharges electric charge, uniformly charged to the surface of the dielectric 1*c*, into the discharge space. Since the spark discharge is a discharge that limitedly discharges electric charge into a space charged at a minute portion of the surface of the dielectric 1*c*, the discharge itself becomes an intermittent discharge of a continuation discharge for a minute time with a minute discharge diameter. Thus, it is characterized that one discharge corresponds to countless number of intermittent discharges that uniformly occur on the entire surface of the discharge surface applied with nanosecond short-lived discharge with a discharge column of several tens of nanometers in diameter, and since this discharge is a very high electric field discharge, it has a special discharge form capable of emitting high-energy discharge light over the entire surface of the discharge surface.

The dielectric barrier discharge can realize a high electric field discharge as the discharge surface has a low temperature or the discharge gap length d is reduced. In the dielectric barrier discharge, high energy discharge light is emitted, and the discharge light becomes discharge light shifted closer to the ultraviolet light side. As the light energy of the dielectric barrier discharge, the discharge has higher energy than other discharge forms but does not have light energy of about not less than 4 eV, and the light wavelength width of emitted light is 600 nm of visible light to 300 nm of ultraviolet light.

The transition metal elements, metal elements, and metalloid elements shown in the periodic table of FIG. 2 become metal compounds having unique properties by oxidation or nitridation and may become substances having conductivity like metal, substances having magnetism, or dielectric substances having semiconductor properties.

In particular, in metal compounds having dielectric properties, they have various band gaps, absorb light or thermal energy to be excited to an active state, and due to excited valence electrons and behaviors of holes, there are metal compounds having semiconductor properties and metal compounds blocking light or thermal energy and functioning as an insulating material.

(Excited Discharge Surface Material and Oxygen Gas Dissociation Mechanism)

Next, the discharge surface material and oxygen gas dissociation mechanism in the metal compound layer 1*d* excited into the photocatalytic state by discharge plasma will be described. FIG. 3 schematically shows a chemical reaction caused by contact between the discharge surface in the excited state (photocatalytic state) and the oxygen gas supplied to the ozone generator 1.

Since the dielectric barrier discharge is an intermittent discharge of the order of nanoseconds, the gas temperature is low, and the dielectric barrier discharge becomes a discharge of high electric field discharge; therefore, the electrons in plasma are accelerated to high energy. Therefore, the discharge light wavelength of oxygen gas emitting light by collision with electrons has an ability (discharge) to emit discharge light of approximately 600 nm of visible light to 300 nm of ultraviolet light wavelength.

FIG. 3 shows an electron coordination structure and an excited state in a solid of solid state electron theory (band gap theory) in an excited state (photocatalytic state) of a semiconductor material in dielectric barrier discharge. FIG. 3 shows a schematic diagram of a valence electron potential of the electrons (valence electrons) pumped into the conduction band and the hole potential (+hole) induced in the valence band. The valence electron, each potential and valence electron of +holes, and a potential difference (band gap value) between the +holes are specific values determined by a metal compound material. Due to this specific value, dissociation reaction to oxygen atoms is indicated by a chemical reaction between the metal compound material in the excited state and passing oxygen gas. In particular, this dissociation reaction is closely related to a chemical reaction of the oxygen molecule with the potential of the +hole induced in the valence band. FIG. 3 schematically shows a dissociation mechanism for dissociating the oxygen gas into oxygen atoms.

With reference to FIG. 3, an operation of a function in which a semiconductor material becomes the excited state (photocatalytic state) by discharge light and a dissociation reaction action to oxygen atoms will be described. A metal compound mainly composed of a metal element belonging to the first metal compound species 201 shown in FIG. 2 and having the semiconductor properties is fixed as the metal compound layer 1d to a wall surface (discharge surface) of an electrode or the like in a dielectric barrier discharge space, the band gap of the metal compound having the semiconductor properties in the metal compound layer 1d is in a range of 2 eV to 4 eV. In this way, when the electron coordination structure having the band gap of the metal compound having the semiconductor properties is taken as the discharge surface, as shown in FIG. 3, the metal compound having the semiconductor properties effectively absorbs dielectric barrier discharge light (discharge light energy) having energy higher than the band gap. As a result, the metal compound having the semiconductor properties in the range of 2 eV to 4 eV upon irradiation with the discharge light is in the excited state (photocatalytic state), and an electron is jumped out from a valence band and transferred (pumped) to a conduction band. In the valence band from which the electron is simultaneously transferred, the positive hole (hole) is induced, and a hole potential is formed. The electron having been transferred to the conduction band moves to the periphery, or the electron is discharged to a discharge region. Thus, the lifetime of the electron ends. That is, the lifetime of the electron having been transferred to the conduction band is very short, several tens psec. Since the positive hole in the valence band continuously exists at a position having a predetermined potential unless the electron having been transferred to the conduction band returns due to recombination, the lifetime of the positive hole is relatively long, that is, 200 to 300 nsec. When the discharge surface in the excited state (photocatalytic state) where the positive hole having not less than a predetermined potential exists is brought into quantum contact with an oxygen molecule, the outermost electron shared with the oxygen molecule is stolen, thus physically dissociating the oxygen molecule to oxygen atoms, so that in the semiconductor material in the excited state, a reaction returning to a ground state is accelerated (phenomenon of adsorption and dissociation of oxygen by the photocatalyst [oxidation reaction]). A relationship between the binding potential of the outermost electron shared with the oxygen molecule and the hole potential induced by excitation to the photocatalytic state of the discharge surface greatly contributes to promotion of the phenomenon of adsorption and dissociation of oxygen (oxidation reaction) by the photocatalyst. That is, it is said that the binding potential of the outermost electron shared with the oxygen molecule is approximately 1.25 eV, and a substance in a state in which the hole potential in the photocatalytic state exceeds 1.25 eV has an ability where the hole of the excited metal compound steals the outermost electron shared with the oxygen molecule and acts to easily dissociate the oxygen gas.

If the reaction of exciting the semiconductor material by the discharge light and the dissociation reaction in which an oxygen molecule is physically dissociated into oxygen atoms and the semiconductor material in the excited state returns to the ground state are continuously repeated, a high concentration of oxygen atoms can be catalytically generated as a result. It has been found that in order to achieve the excited (activated) state of the substance and the dissociation reaction of oxygen in series, if not only a predetermined band gap range but also a hole potential of the semiconductor material in the excited state is not less than the oxygen dissociation potential, dissociation reaction to oxygen atoms cannot be performed.

That is, as a metal compound having a dissociation catalytic function for dissociating oxygen gas in contact with the discharge surface to oxygen atoms, a metal compound in which the hole potential of the photocatalytic state exceeds 1.25 eV effectively acts as the ozone generator 1 which generates high concentration ozone gas. In the photocatalytic state in which oxygen gas can be readily dissociated into oxygen atoms, if the metal compound as the metal compound layer 1d is applied directly onto the discharge surface of the ozone generator 1, the applied metal compound can be effectively irradiated with infinite number of light beams of dielectric barrier discharge having a minute discharge column in nanoseconds, and the metal compound can be effectively excited into the photocatalytic state. Thus, the oxygen gas in the discharge space is dissociated into a high concentration of oxygen atoms, and the discharge surface of the metal compound is continuously irradiated with discharge light, whereby the discharge surface of the metal compound is always in the excited state, and the high concentration of oxygen atoms are produced catalytically, so that a state in which oxygen atoms are generated with high efficiency is obtained. By generating the high concentration of oxygen atoms, ozone generation performance is also increased in the ozone generator 1, so that the ozone generation efficiency of the ozone generator 1 is increased, and an action is performed such that an ability to take out high concentration ozone gas is obtained.

As described above, in order to obtain high concentration ozone gas, it is indispensable to produce a high concentration of oxygen atoms not less than dissociation into oxygen atoms due to electron collision of discharge, ozone decomposition in the generator is uniquely determined by gas conditions such as gas pressure and the structure of the generator, and there is almost no effect of suppressing decomposition by the property of a discharge substance material.

(Mechanism of Ozone Gas Generation by Bonding of Dissociated Oxygen Atoms and Oxygen)

Next, a mechanism from a high concentration of generated oxygen atoms to generation of ozone gas in the ozone generator 1 will be described.

Even in a case of nitrogen-free oxygen or high purity oxygen gas, the light wavelength of the discharge light emitted by the dielectric barrier discharge is approximately 600 nm of visible light to 300 nm of ultraviolet light.

When a metal compound having a band gap of 2.0 (eV) to 4.0 (eV) is fixed as the metal compound layer 1d to the entire surface of the discharge surface (wall surface) of the ozone generator, the metal compound having semiconductor properties absorbs the discharge energy light having an energy higher than the band gap, and the metal compound having the semiconductor properties is excited to be in the photocatalytic state. In a chemical catalytic reaction at an interface where the metal compound in the photocatalytic state is in contact with the oxygen gas, a chemical catalytic reaction occurs in which the metal compound dissociates oxygen gas into atoms when returning from the photocatalytic state to the ground state. Since discharge light is continuously irradiated during discharge, the metal compound fixed to the entire discharge surface immediately enters the photocatalytic state, oxygen dissociation reaction is continued, and dissociation into oxygen atoms is accelerated, thus generating a high concentration of oxygen atoms.

Moreover, as shown in the schematic diagram of FIG. 4, in the continuously excited state of the metal compound on the discharge surface, a high concentration of oxygen atoms is generated by a function of accelerating the binding action on the metal compound layer $1d$ (wall M) due to three-body collision among the high concentration of oxygen atoms catalytically generated, the supplied oxygen molecule (residual raw material oxygen gas), and a third material. The efficiency with which ozone gas can be generated with respect to a discharge electric power W and per unit gas quantity is evaluated as the ozone generation efficiency $\eta$ (mg/J). Consequently, in the metal compound, the higher the ozone generation efficiency $\eta$, the higher the ozone concentration that can be taken out.

The chemical catalytic reaction at the interface where the metal compound in the photocatalytic state is in contact with the gas, specifically, a thermal catalytic reaction for ozone decomposition in which ozone gas is decomposed into oxygen gas and oxygen atoms by bringing into contact with ozone gas at a relatively high temperature is well known.

Among thermal catalytic materials for ozone decomposition, in particular, in a metal compound having a metal element of Mn, Co, Ni, Cu, and Ag and an oxide-based substance of NOx, even at a low temperature as compared to other metal compounds, the formulas (2) and (3) as the following thermal catalytic reaction formula are promoted by a contact between these materials and ozone gas, and it has been said that ozone is easily catalytically decomposed at low temperature. In the formulas (2) and (3), Q represents the metal element of the thermal catalytic material for ozone decomposition or NOx gas, and $E_L$ represents low temperature thermal energy.

[Formula 2]

$$Q \cdot O_2 + E_L + O_3 \Rightarrow Q \cdot O_2 + O + O_2 \qquad (2)$$

[Formula 3]

$$Q \cdot O_2 + E_L + O_3 \Rightarrow Q \cdot O_2 + 2O_2 \qquad (3)$$

However, with regard to a catalytic gas for ozone decomposition by NOx, if the amount of NOx contained in oxygen gas is made not more than several ppm and low temperature NOx gas is excited with the light energy of the dielectric barrier discharge, it is possible to create a state in which the decomposition catalytic reaction of oxygen gas into oxygen atoms is accelerated rather than the decomposition catalytic reaction to dissociate ozone gas into oxygen. As a result, a selective decomposition catalytic reaction state of oxygen gas can be realized, and ozone is generated by a three-body collision reaction of the dissociated oxygen atoms and oxygen gas, so that high concentration ozone can be taken out. This fact is clarified from Patent Document 1, for example.

As disclosed in Patent Document 1, this is why high concentration ozone can be obtained by adding a slight amount of nitrogen gas to the raw material gas.

Thus, when gas containing a slight amount of NOx gas in oxygen gas is made to perform dielectric barrier discharge, a reaction to generate ozone from catalytic high-concentration oxygen dissociation with a slight amount of NOx gas occurs. If the Nox amount is set under conditions in which an ozone decomposition reaction effect to decompose ozone gas generated with the NOx gas can be suppressed to a very small degree as compared to the reaction effect to generate ozone, even the NOx gas called an ozone decomposition catalyst material becomes a catalytic gas with high ozone generation efficiency.

In the present invention, dielectric barrier discharge is generated in a low temperature high purity oxygen gas, a metal compound having the semiconductor properties is applied as the metal compound layer $1d$ onto the entire surface of the discharge surface. When the metal compound is excited to the photocatalytic state by the light energy of the dielectric barrier discharge, the following formulas (4) to (6), which are chemical catalytic reaction formulas, are promoted at an interface where the metal compound in the photocatalytic state is in contact with the oxygen gas, a high concentration of oxygen atoms is generated catalytically, and ozone is generated by the formula (7) which is a three-body collision reaction formula of the generated oxygen atoms and oxygen gas. High concentration ozone is generated in the ozone generator 1 under a condition in which the ozone generation amount is larger than the ozone amount where ozone in contact with the surface of the metal compound described above is catalytically decomposed

[Formula 4]

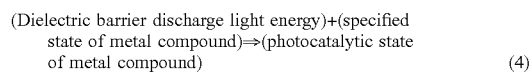
$$\text{(Dielectric barrier discharge light energy)} + \text{(specified state of metal compound)} \Rightarrow \text{(photocatalytic state of metal compound)} \qquad (4)$$

[Formula 5]

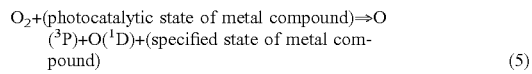
$$O_2 + \text{(photocatalytic state of metal compound)} \Rightarrow O(^3P) + O(^1D) + \text{(specified state of metal compound)} \qquad (5)$$

[Formula 6]

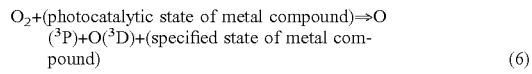
$$O_2 + \text{(photocatalytic state of metal compound)} \Rightarrow O(^3P) + O(^3D) + \text{(specified state of metal compound)} \qquad (6)$$

[Formula 7]

$$O + O_2 + M \Rightarrow O_3 + M \qquad (7)$$

When a metal compound substance in which the catalytic reaction amount for dissociating oxygen gas into oxygen atoms by the reactions of the above formulas (4) to (6) is larger than the catalytic reaction amount for decomposing and promoting ozone gas by the reactions of the above formulas (2) and (3) can be selected, or when an environmental condition of ozone generation capable of accelerating the three-body collision reaction of the formula (7) can be created in the ozone generator 1, the ozone generation efficiency $\eta$ (g/J) is increased, and high concentration ozone gas can be generated. When a metal element of a metal compound satisfying the above-described conditions is selected in the periodic table, the metal element corresponds to an element belonging to the first metal compound species 201 in FIG. 2 and V, Cr, Nb, Mo, Ta, W or the like, and Bi.

In the metal compound having properties of a semiconductor containing Y, Zr, Al and Si elements shown in the periodic rate table, the concentration of ozone that can be taken out is about 2 g/m$^3$ (933 ppm) to not more than 20 g/m$^3$ (not more than 9333 ppm), and the metal compound having the semiconductor properties has a band gap of not less than 5 eV and is a substance which can hardly be excited to the above-described photocatalytic state in dielectric barrier discharge light; therefore, it can be seen that in the substance, the reaction of the formula (4) which is an excitation reaction formula of the above substance cannot be performed and thus the reaction of the formulas (5) and (6), which are reaction formulas for dissociating oxygen, cannot be performed. That is, even when a metal compound having a band gap of not less than 5 eV is applied, catalytic oxygen atoms cannot be generated by the discharge surface material, so that there is no high concentration ozone generation ability effect, oxygen is dissociated by collision of only electrons themselves of dielectric barrier discharge, and the metal compound has only an ability to generate ozone. In this type of metal compound, since the formulas (2) and (3) for catalytically decomposing generated ozone gas are weak, so that the ozone concentration is so low as not more than 20 g/m$^3$ (not more than 9333 ppm) that is the concentration of ozone that can be generated by electrons of discharge.

FIG. 4 shows a mechanism by which ozone is generated by the binding action of oxygen atoms and oxygen molecules dissociated with a metal compound having the semiconductor properties. In order to bind the oxygen atom and the oxygen molecule, energy cannot be effectively transferred simply by collision between the oxygen atom and the oxygen molecule, so that the binding action cannot be effectively promoted. In order to effectively promote the binding action, as shown in FIG. 4, three-body collision with a third material (M) (metal compound layer 1*d*) such as a wall for transferring energy is necessary simultaneously with the collision of oxygen atoms and oxygen molecules.

In order to effectively promote the three-body collision as described above, it is effective to increase gas pressure and increase a gas molecule density. Experiments have shown that when the gas pressure is set to an absolute pressure of 0.2 (MPa) or more, the three-body collision is promoted suddenly and the ozone generation efficiency is increased. In addition, when the gas pressure is increased to an absolute pressure of 0.5 (MPa) or more, a discharge voltage rises, making it difficult to sufficiently inject a discharge power, and, at the same time, collision between gas particles increases, so that the ozone decomposition amount is increased, and high concentration ozone cannot be obtained, which makes it unsuitable. The gas pressure in a reaction space is preferably in a range of an absolute pressure of about 0.3 (MPa) to 0.4 (MPa).

(Relationship with Ozone Generation Efficiency by Discharge Surface Material)

FIG. 5 is an explanatory view showing the excited state (photocatalytic state) of a metal compound having semiconductor properties used for a constituent material of the metal compound layer 1*d* used in the present invention. In FIG. 5, a horizontal axis represents a light absorption wavelength at which a metal compound having semiconductor properties absorbs light to enter the excited state, and the light absorption wavelength is correlated with the potential width of the band gap of the metal compound having the semiconductor properties. On the other hand, a vertical axis represents the excitation potential of valence electrons pumped into a conduction band when the metal compound having the semiconductor properties is in the excited state and the excitation potential of the hole induced in the valence band. A potential difference between the excitation potential of the valence electron and the excitation potential of the hole corresponds to the band gap potential. In FIG. 5, the lower potential indicated by the characteristic line BL-V of the band gap potential width indicated by each metal compound having semiconductor properties indicates the hole potential formed in the valence band, and the upper potential indicated by the characteristic line AL-V indicates the electron potential of valence electrons pumped into the conduction band.

This band gap potential width is an important factor of an ability to excite the metal element compound by discharge light. The hole potential BL-V and the electron potential AL-V in the excited substance are important factors affecting the chemical reaction.

As the band gap potential width of each metal element compound, in metal elements, it is 2.2 (eV) in chromium (Cr) BG (band gap) 301*g*, it is 2.5 (eV) in tungsten (W) BC 302*g*, it is 2.41 (eV) in vanadium (V) BG 303*g*, it is 3.0 (eV) in molybdenum (Mo) BG 304*g*, it is 3.4 (eV) in niobium (Nb) BC 305*g*, it is 4.0 (eV) in tantalum (Ta) BC 306*g*, it is 3.5 (eV) in nickel (Ni) BC 307*g*, it is 3.3 (eV) in zinc (Zn) BG 308*g*, it is 6.0 (eV) in yttrium (Y) BG 309*g*, it is 5.0 (eV) in zirconium (Zr) BG 310*g*, and it is 2.6 (eV) in bismuth (Bi) BG 313*g*.

In FIG. 5, the characteristic line AL-V is obtained by connecting the valence electron potentials in the excited state of a metal oxide compound as each metal compound with an envelope, and the characteristic line BL-V is obtained by connecting the induced+hole potential in the excited state of a metal oxide compound as each metal compound with an envelope. Each of these potentials is formed with a specific potential of the metal compound.

The ozone generator 1 supplied with oxygen gas according to the present embodiment forms dielectric barrier discharge with a short gap of several tens to several hundreds of μm, and the discharge surface is devised such that it has a cooling structure such as water cooling, so that the temperature of the discharge surface can be reduced to not more than 20° C.

In the electric barrier discharge generated by the ozone generator 1, the electric field intensity is made higher than the usual electric field intensity of the discharge in the ozone generator 1. Thus, the discharge light energy also increases, and the discharge light has a wavelength width from 300 nm of ultraviolet light to 600 nm of visible light.

A potential position shown by the broken line of the potential 1.25V in FIG. 5 indicates the binding potential of the electron by the outermost shell electron of an oxygen molecule, and external energy having energy not less than the binding potential of the electron is not applied to the bound electron of the oxygen molecule, this value corresponds to a threshold at which oxygen gas cannot be dissociated.

The high concentration ozone generatable range 3001 has a light absorption wavelength width in which in the metal compound layer 1*d* applied to the ozone generator 1, light energy of dielectric barrier discharge is absorbed and can be excited to the photocatalytic state, and in the excited state of the metal compound, the high concentration ozone generatable range 3001 indicates a range where the dissociation reaction of oxygen molecules can be accelerated by the hole potential formed in the valence band. That is, in the metal compound having the semiconductor properties and shown by the high concentration ozone generatable range 3001, the hole potential induced by excitation has a potential higher than the binding potential (1.25 (eV)) of the oxygen molecule. Thus, the high concentration ozone generatable range 3001 corresponds to a metal compound region in which a chemical reaction for dissociating oxygen gas is accelerated by a chemical reaction between induced holes and oxygen molecules contacting at the interface. The region in the light wavelength range of the high concentration ozone generatable range 3001 is a region having a light absorption wavelength of 300 (nm) to 600 (nm), and due to the short-gap dielectric barrier discharge, the region corresponds to the wavelength range of emitting discharge light. It was experimentally confirmed that a metal compound having the light absorption wavelength corresponding to the wavelength width of the discharge light indicated by the high concentration ozone generatable range 3001 and a hole potential not less than the potential showing the dissociation reaction of oxygen gas matched well the metal compound from which high concentration ozone can be obtained according to the present invention.

From this, it can be asserted that the reason why the metal compound material applied as the metal compound layer $1d$ to the discharge surface greatly contributes to ozone generation action is a phenomenon in which an oxygen atom concentration is catalytically increased by dissociation of high concentration oxygen gas by the metal compound excited by discharge light.

However, here, zinc BG $308g$ of a semiconductor material containing zinc (Zn) as an element is in a band gap (light absorption wavelength) range of the high concentration ozone generatable range $3001$, and the range matches a range where high concentration ozone can be taken out within an oxygen dissociation acceleration potential range; however, the metal compound substance containing Zn element generally belongs to a transparent electrode material, and in the case of applying the metal compound ZnO having the semiconductor properties, discharge light energy of visible light is transmitted, and therefore, zinc BG $308g$ is also a substance in which it is difficult to excite the applied metal compound substance to the photocatalytic state. Thus, the ozone generation efficiency is low, the ozone concentration that can be taken out is approximately about 6 g/m³ (2800 ppm), and high concentration ozone gas cannot be taken out. As the metal compound substance as a transparent electrode material other than the Zn element, there are Ga-based, Ge-based, Cd-based, In-based and Sn-based metal compounds.

Since the metal compound of nickel (Ni) itself is one of elements of a catalytic substance decomposing ozone gas by obtaining low temperature thermal energy, even if ozone gas is generated in the ozone generator $1$, the generated ozone is ozonolyzed by ozone catalytic action of NiO (metal compound) (by the formulas (2) and (3) as catalytic ozone decomposition reaction formulas), so that the ozone concentration that can be taken out is very low.

As a metal compound substance known as ozone decomposition catalytic action at low temperature other than the nickel (Ni) element, there are metal compound substances of Mn, Co, Cu and Ag. In any case, it is confirmed that in measurement of the ozone concentration that can be taken out by performing an ozone generation experiment under the same conditions, only approximately several g/m³ of the ozone concentration can be obtained.

Although the metal compounds themselves having the semiconductor properties have an ability to decompose ozone gas catalytically by the ozone decomposition reaction formulas (2) and (3) by obtaining thermal energy, the ozone decomposition reaction action is weak except for the metal compound substances of Mn, Co, Cu, and Ag, and in particular, in the ozone generator in a low temperature state, catalytic decomposition action of ozone gas by heat can be suppressed low.

FIG. 6 shows the ozone concentration characteristics ($301b$ to $310b$) that can be taken out with respect to injected discharge energy due to a difference in substance of a metal compound having the semiconductor properties according to the embodiment of the present invention.

In FIG. 6, a horizontal axis represents an injection power value W/Q value (specific power amount) per unit gas flow rate from the discharge electric power W injected into the ozone generator $1$ and the oxygen gas flow rate Q supplied to the ozone generator $1$, and a vertical axis represents the ozone concentration value.

The ozone concentration characteristics that can be taken out by each metal compound substance are as shown by the ozone concentration characteristics $301b$ to $310b$ indicated by the solid lines. The maximum ozone concentration Cmax that can be taken out from the characteristic is the maximum ozone concentrations Cmax 1 to Cmax 6, and as a result, the ozone concentrations are significantly different depending on the metal compound substance.

In the good concentration characteristic groups $301b$ to $305b$, it can be seen that the injected specific power value W/Q value is about not less than 100 (W·min/L), and the high concentration ozone of about not less than 200 (g/m³) can be taken out. It has been found that the specific power value W/Q value capable of obtaining the maximum ozone concentration Cmax is within a range of 300 (W·min/L) to 500 (W·min/L). Although an optimum range value of the specific power value W/Q value is 300 (W·min/L) to 500 (W·min/L), it has been found that within the optimum range of the specific power value W/Q value, there is an optimum range in a range of the discharge electric power W under the condition that the gas flow rate Q is constant. That is, it is found that when the discharge electric power W is small, a metal compound surface of the discharge surface cannot be excited sufficiently by discharge light, an oxygen dissociation amount becomes insufficient, and high concentration ozone cannot be taken out. On the contrary, when the discharge electric power W is too large, the gas temperature in the discharge space increases, and ozone decomposition of generated ozone is promoted at the gas temperature, so that high concentration ozone cannot be taken out. The optimum range of the discharge electric power W is related to a discharge area S of the discharge surface of the ozone generator, and in particular, it has been found that there is an optimum range as a value of a discharge power density W/S. Experiments have shown that a range of the optimum discharge power density W/S is in a range of 1 to 5 (W/cm²).

Even when the range is set to an optimum specific power value W/Q range and the discharge power density W/S range, in the concentration characteristics $307b$ to $310b$, the range is about 2 g/m³ (933 ppm) to not more than 20 g/m³ (not more than 9333 ppm), and as a result, high concentration cannot be obtained.

The concentration increases while the gradient of the tangent characteristic (gradient characteristics $301a$ to $311a$) at a low W/Q value of each ozone concentration characteristic is proportional to the injected specific power amount W/Q value, the gradient of the tangent characteristic shows the ozone generation ability (ozone generation amount) that can be generated with the metal compound substance having the semiconductor properties and applied onto the discharge surface and is shown as the ozone generation efficiency η (mg/J).

When the ozone concentration characteristic is evaluated by the ozone generation efficiency η (mg/J) with the use of the metal compound substance having the semiconductor properties, the ozone generation efficiency η is 0.0307 (mg/J) in the chromium gradient characteristic $301a$, it is 0.05 (mg/J) in the tungsten gradient characteristic $302a$, it is 0.0377 (mg/J) in molybdenum gradient characteristics $304a$, it is 0.0406 (mg/J) at the niobium gradient characteristics $305a$, it is 0.0155 (mg/J) at the bismuth gradient characteristics $313a$, and all values are high. The taken-out ozone concentration is within the high concentration ozone generatable range $2001$, indicating that high concentration ozone gas of not less than 200 g/m³ can be taken out.

On the other hand, in the gradient characteristics $307a$ to $310a$, the ozone generation efficiency η is 2.78E-6 (mg/J) in the nickel concentration gradient characteristic 307a, it is 9.49E-5 (mg/J) in the zinc gradient characteristic 308a, it is 1.59E-4 (mg/J) in the yttrium gradient characteristic 309a, and it is 9.49E-5 (mg/J) in the zirconium gradient characteristic 310a, so that the ozone generation efficiency η of them is low. As a result, the ozone concentration that can be taken out is extremely low.

FIG. 7 is a diagram showing logarithmic representation of the gradient of the tangent characteristic (gradient characteristics 301a to 310a and 313a) at the low W/Q value in the ozone generator 1 applied with each metal compound obtained from the ozone concentration characteristic of FIG. 6. That is, FIG. 7 is a graph showing logarithmic representation of the ozone generation amount (g/m$^3$) with respect to the electric power (specific power W/Q (W·min/L)) injected by dielectric barrier discharge per unit volume of the supplied oxygen gas.

In FIG. 7, the element concentration characteristics 301c to 310c and 313c show characteristics in which, even when the same discharge energy is injected, the amount of ozone that can be generated is significantly different depending on a difference in the substance of the metal compound. In the characteristic group GA, the metal compound having the ability to generate ozone of not less than 0.1 g per 1 cubic meter volume of gas with respect to the specific power W/Q is shown, and the ozone generator 1 capable of taking out a high concentration ozone gas can be achieved by using the ozone generator 1 applied with the metal compound substance of the characteristic group GA as the metal compound layer 1d.

In the characteristic group GB, a metal compound group having an ability to generate ozone of not less than 0.001 g which is two orders of magnitude lower than the characteristic group GA is shown.

In the characteristic group GC, a metal compound substance group capable of generating only ozone of 0.00001 g which is four orders of magnitude lower than the characteristic group GA is shown. Three-digit numerical portions of 301c to 310c and 313c are metal compound substances corresponding to the three-digit numerical portion shown in FIG. 6.

Regardless of the substances of the characteristic groups GA, GB and GC, due to acceleration of the electrons in the dielectric barrier discharge and avalanche electron collision, the discharge plasma itself has an ozone generation ability of at least about not more than 20 g/m$^3$.

Accordingly, in the case of the characteristic group GA, since high concentration ozone of not less than 200 g/m$^3$ is obtained, it is suggested that a drastic high concentration is obtained by the effect of the metal compound applied onto the discharge surface.

As can be seen from FIG. 7, in the metal compound shown by the characteristic group GA, a substance group is shown in which the discharge surface itself is activated by dielectric barrier discharge, whereby the action (force) of the activated metal compound causes oxygen gas to be catalytically dissociated into oxygen atoms, which can lead to a large ozone generation amount.

In the case of the characteristic group GB, the obtained concentration is approximately less than 20 g/m$^3$, and since the concentration that can be taken out corresponds approximately to the ozone concentration obtained by generation only by collision of electrons and oxygen of discharge plasma itself, it is determined that there is almost no effect of the metal compound applied onto the discharge surface.

Since the metal compound (ZnO, Y$_2$O$_3$, ZrO$_2$) shown in the characteristic group GB is a substance having properties of transparent conductive metal oxide or a substance belonging to a so-called insulator having a band gap exceeding 4 eV, the metal compound is a substance having little influence such as activation of the discharge surface itself due to discharge light energy of dielectric barrier discharge. For this reason, although there is a case where oxygen dissociates due to electron collision of the dielectric barrier discharge to generate ozone, a substance group having no ability to dissociate oxygen gas with the metal compound itself to generate ozone is shown. As the other substances, CdO, In$_2$O$_3$, SnO$_2$, and the like may be used as the substance exhibiting transparent conductivity in addition to ZnO. There are B$_2$O$_3$, alumina Al$_2$O$_3$, and quartz SiO$_2$ as substances belonging to a so-called insulator having a band gap exceeding 4 eV, and it is said that only the ozone concentration of not more than 20 g/m$^3$ can be taken out from these substances. However, it has been said in Patent Document 3 as the prior art that high concentration ozone can be obtained by using an insulating material obtained by mixing a substance such as the characteristic group GA with the above-described alumina or quartz glass by sintering means or the like.

In the case of the characteristic group OC, the concentration obtained is approximately several g/m$^3$, and since the concentration that can be taken out is almost reduced to about 1/10 of the concentration obtained by the discharge plasma itself, there is no ability to generate ozone by the metal compound applied onto the discharge surface, and, on the contrary, it is judged that the effect of decomposing ozone generated by discharge plasma by the catalytic decomposition reaction on the metal compound surfaces is increased.

Since the metal compound (NiO) shown by the characteristic group GC is a substance which performs the catalytic decomposition reaction of ozone gas with low temperature thermal energy, the metal compound is a substance having little influence such as activation of the discharge surface itself due to the discharge light energy of the dielectric barrier discharge, and a substance group having an ability to catalytically decompose ozone when ozone gas itself comes into contact with the metal compound, the ozone gas being generated by oxygen dissociation through collision of electrons of dielectric barrier discharge. Thus, as shown in FIG. 7, the ozone generation amount in the characteristic group GC is 0.00001 g/m$^3$ which is two orders of magnitude lower than the ozone generation amount in the characteristic group GB.

As substances catalytically decomposing ozone gas with the low temperature thermal energy, there are substances such as MnO$_3$, Co$_2$O$_3$, Cu$_2$O, and Ag$_2$O.

As seen from FIGS. 6 and 7, as the ozone generator capable of taking out high concentration ozone of not less than 200 g/m$^3$, the ozone generation efficiency η of not less than 0.01 (mg/J) is at least required, and it has been found that, as the metal compound substance having the semiconductor properties and applied onto the discharge surface, a metal compound substance containing V, Cr, Nb, Mo, Ta, and W elements and a metal compound substance containing a Bi element are required.

FIG. 8 corresponds to the characteristic numbers and the product numbers of the metal compound substances shown in FIGS. 6 and 7 and summarizes, in a list in a table format, physical properties of an oxide metal material in the ozone generator 1 in which the metal compound having specific semiconductor properties in the present invention is fixed as the metal compound layer 1d to the discharge surface, the ozone generation efficiency η, and the maximum ozone generation concentration Cmax in the present invention.

The material product numbers 301 to 306 and 313 show the first metal compound species 201 of the metal compound according to the present invention from which the high concentration ozone can be taken out, and are constituted of a substance corresponding to the element metal of Group 5 or 6 in the element periodic table and a substance which has a band gap in the range of 2.0 to 4.0 (eV) and in which the hole potential of a valence band portion formed in the excited state is larger than the binding potential (1.25 (eV)) of an oxygen molecule.

From the list of an embodiment in a main metal element substance in FIG. 8, the ozone generation efficiencies η of the metal compound ($V_2O_5$) of vanadium 303 and the metal compound ($Bi_2O_3$) of bismuth 313 are 0.0138 (mg/J) and 0.0155 (mg/J), respectively, and the ozone generation efficiencies η of the metal compound ($WO_3$) of tungsten 302, the metal compound of molybdenum 304 ($MoO_3$), and the metal compound ($NbO_5$) of niobium 305 are 0.05 (mg/J), 0.0406 (mg/J), 0.0377 (mg/J), respectively. With respect to these ozone generation efficiencies η, the maximum ozone concentration that can be taken out in the ozone generator 1 is from more than 200 (g/$m^3$) to approximately 500 (g/$m^3$), and the maximum ozone concentration Cmax that can be taken out corresponding to the value of the ozone generation efficiency is high.

In the metal compound (NiO) of nickel 307, only the ozone generation efficiency η of only 2.78 E-6 (mg/J) is obtained, the maximum ozone concentration Cmax that can be taken out is only 0.2 (g/$m^3$), and the metal compound of nickel 307 does not have the ozone generation ability at all. The metal compound of nickel 307 not only has no ozone generation ability but also catalytically decomposes or dissociates by coming into contact with ozone gas of approximately several tens g/$m^3$ generated by electron collision of dielectric barrier discharge, and it is shown that the maximum ozone concentration Cmax that can be taken out is a substance in which the ozone concentration is reduced to 0.2 (g/$m^3$) that is about 10%.

In the metal compound (ZnO) of zinc 308, the ozone generation efficiency η is only 9.49E-5 (mg/J), and the metal compound of zinc 308 has no catalytic ozone generation ability. However, while the ozone concentration generated by electron collision in dielectric barrier discharge is approximately several tens g/$m^3$, the maximum ozone concentration Cmax that can be taken out is approximately 6 (g/$m^3$), and therefore, the ability to catalytically decompose and dissociate generated ozone gas is not so high.

In the metal compounds ($Y_2O_3$, $ZrO_2$, $Al_2O_3$, $SiO_2$) of the material product numbers 309 to 312, the ozone generation efficiencies η are only 9.49E-5 to 1.59E-4 (mg/J), and the metal compounds have no catalytic ozone generation ability. In addition, while the ozone concentration generated by the electron collision in the dielectric barrier discharge is approximately several tens g/$m^3$, the maximum ozone concentration Cmax that can be taken out is 6 to not more than 20 (g/$m^3$), and therefore, the metal compounds are substances which do not have the ability to catalytically decompose and dissociate generated ozone gas at all and are stable substances showing no chemical reaction.

As described above, the metal compounds of the material product numbers 301 to 306 and 313 have the catalytic ozone generation ability by the discharge surface material, and correspond to the first metal compound species 201 to which the substance capable of generating high concentration ozone according to the present invention belongs. On the other hand, the metal compound of nickel 307 corresponds to the second metal compound species 202 which is a substance catalytically decomposing ozone by the discharge surface material.

The metal compound of zinc 308 transmits discharge light and does not absorb light absorbed and corresponds to the third metal compound species 203 which is a substance which does not have a function of catalytically generating or decomposing ozone by the discharge surface material. The metal compounds of the material product numbers 309 to 312 are substances having a band gap exceeding 4 eV, are substances having no ability to absorb light with respect to discharge light and having no function of catalytically generating or decomposing ozone by the discharge surface material, and correspond to the fourth metal compound species 204. In this way, the metal compounds of the material product numbers 301 to 313 can be classified into the four metal compound species 201 to 204.

The substance (the first metal compound species 201) capable of generating high concentration ozone according to the present invention is not a conductor, has a band gap range of 2.0 to 4.0 (eV), and can be activated to the photocatalytic state by absorbing dielectric barrier discharge and light energy, and the substance in the photocatalytic state is a metal compound having properties of a semiconductor in which the potential of the hole induced in a valence band portion formed in the excited state is larger than the binding potential (1.25 (eV)) of an oxygen molecule. Thus, the hole induced in the substance has a force to pull electrons from the outside and, by the force of this hole, acts to steal the shared electrons of the outer orbital of oxygen gas and dissociate oxygen.

By this action, in chromium (Cr), vanadium (V), tungsten (W), molybdenum (Mo), niobium (Nb), tantalum (Ta) and bismuth (Bi) as main metal elements, in any case, many oxygen atoms are generated. As a result, a high concentration ozone gas is generated from the ozone generator 1, and a high concentration ozone gas can be taken out. It has been found that the ozone generation efficiency η calculated from the ozone concentration characteristics of those substances exceeds about 0.01 (mg/J). In the ozone generator 1 in which the metal compound having these metal elements is fixed as the metal compound layer $1d$, the ability to catalytically decompose oxygen gas is high and the ability to decompose ozone is suppressed low. Accordingly, the metal compound belonging to the first metal compound species 201 is not a substance promoting ozone decomposition.

As described above, the metal compound containing chromium (Cr), vanadium (V), tungsten (W), molybdenum (Mo), niobium (Nb), tantalum (Ta) and bismuth (Bi) as main metal elements satisfies the following four conditions.

(1) The metal compound is not a substance promoting ozone decomposition and, specifically, is not a metal compound of Mn, Co, Ni, Cu, and Ag.

(2) The metal compound is not a conductor.

(3) The band gap of the metal compound layer $1d$ is in the range of 2.0 to 4.0 [eV].

(4) The hole potential of the valence band portion formed in the excited state of the metal compound layer $1d$ is larger than the binding potential (1.25 (eV)) of the oxygen molecule.

(The Number of Outermost Shell Electrons of Metal Element of Discharge Surface Material and Superiority of Excited State by Discharge Light of Discharge Surface Material)

The effectiveness of ozone generation in electron arrangement belonging to Groups 5 and 6 of the periodic table will be explained.

In element metals of metal oxide compound substances from which high concentration ozone gas is obtained, elements corresponding to Groups 5 and 6 of the periodic table are highest. In metal compounds having semiconductor properties and mainly composed of metal elements of Groups 5 and 6 of the periodic table, when arrangement of the electrons of the metal elements is shown, the number of electrons of the outermost orbital is 2 to 3 in any case. Therefore, when external energy such as discharge light is absorbed, the electrons of the outermost orbital can be easily pumped (excited) into a conduction band of a semiconductor material.

In the periodic table of metal elements of FIG. 2, generally, in the metal elements or semi-metal elements of Groups 3 to 4 and 14 to 15, the number of electrons of the outermost orbital is 1 or 2 or is short by one or two, and metal compound is formed by electronically combining two elements (for example, a metal element and an oxygen element) with the electrons of the outermost orbital. Thus, if the metal element which has one or two electrons or in which the electrons is short by one or two is electronically combined with other elements, there is relatively no extra electron of the electrons of the outermost orbital, and a metal compound obtained by electronical combination closer to complete combination tends to be formed, so that the metal compound of the metal elements of Groups 3 to 4 and 14 to 15 becomes a chemically stable insulator with a large band gap and tends to become a metal compound unsuitable for ozone generation.

In metal elements other than Groups 3 to 4 and 14 to 15, since metal compound obtained by electronical combination having extra electrons is formed, the metal elements tend to become a metal compound which has semiconductor properties and is excited or non-excited by external energy or a metal compound which has properties of a conductor and is always excited.

In the ozone generator 1 which generates high concentration ozone, the ability to catalytically dissociate oxygen gas is necessary, so that the metal compound having the semiconductor properties is particularly effective. In the metal compound having the semiconductor properties, in particular, if the metal compound can be easily activated into the photocatalytic state by discharge light energy, and if in the photocatalytic state, the potential of the induced hole is larger than the electron binding potential of passing oxygen, it can be said that the metal compound is a substance suitable for allowing the induced holes to steal electrons of oxygen gas and accelerating chemical reaction of oxygen dissociation.

(Explanation on Degree of Chemical Reactivity Between Hole Potential of Excited Discharge Surface Material and Oxygen Gas)

At the same time, a metal oxide material in which+holes of not less than 1.25 eV are formed also in the valence band portion is formed, the metal oxide material matches well the potential range of the band gap in the photocatalytic state and the light energy of the dielectric barrier discharge of the ozone generator 1, and the discharge light can be efficiently absorbed. In addition to the band gap range, when the potential of the hole of the excited semiconductor material is higher than the potential of decomposition of oxygen gas in contact with the discharge surface in the discharge space, the chemical reaction can be accelerated. When oxygen is catalytically decomposed, a high concentration of oxygen atoms are generated and high concentration ozone gas can be generated. As a result, high concentration ozone gas can be taken out.

(Effect of Surface Area of Discharge Surface Material)

The superiority of the particle diameter of the metal compound layer 1d applied onto the discharge surface will be described.

In the same metal element compounds, the metal element compound in which an average diameter of particles of a photocatalytic substance was 50 μm and the metal element compound in which the average particle diameter was not more than 10 μm were fixed to the discharge surface. When the ozone concentration characteristic of the ozone generator 1 and the ozone generation efficiency η were measured, it was confirmed that the ozone generation efficiency was increased by about 5%, and the ozone concentration that could be taken out could be increased by approximately 5%. From this, even in the same metal element compounds, if the particle size of the photocatalytic substance fixed to the discharge surface through which discharged oxygen gas passes and a surface irradiated with discharge light are set to the best state, the absorption power of discharge light energy to the fixed substance increases, and dissociation efficiency of the oxygen gas increases to increase the ozone generation efficiency η, so that high concentration ozone can be taken out.

Thus, in the ozone generator 1 of the present embodiment, a metal compound serving as a photocatalytic substance is fixed as the metal compound layer 1d to the discharge surface, and in order to enhance the photocatalytic effect and generate high concentration ozone, it is effective means to reduce in size the crystal structure and particle diameter of the fixed metal compound and thereby increase the surface area of the fixed metal compound.

(Crystal Structure of Discharge Surface Material and Surface Uneven Structure Effect)

As means for increasing the surface area of the metal compound fixed as the metal compound layer 1d to the ozone generator 1, the ozone generation efficiency η is increased by not only reducing the particle diameter of the metal compound itself, but also making the discharge surface have a minute uneven structure to increase the surface area of the discharge surface, so that the ozone concentration that can be taken out is increased.

In addition, the crystal structure peculiar to the metal compound to be fixed has an effect of increasing the surface area of the discharge surface, thus increasing the ozone generation efficiency η, so that the ozone concentration that can be taken out is increased. For example, if the crystal structure peculiar to the metal compound is a crystal structure having a body-centered cubic structure, the crystal of the metal compound surface grown on the discharge surface becomes a texture structure surface. It is said that in the texture structure surface, the discharge surface irradiated with discharge light can effectively perform light absorption by reduction in surface reflection loss and light confining effect, and the discharge surface serves as means for increasing the ozone generation efficiency η.

(Ozone Decomposition Degree by Generated Ozone and Metal Element Substance of Discharge Surface Material)

Hereinabove, as the discharge surface material, the substance which can be in the photocatalytic state capable of catalytically dissociating oxygen gas has been described; however, the metal compound fixed to the discharge surface is also a substance capable of catalytically dissociating and decomposing ozone gas. Thus, it can be said that the metal compound to be fixed to the discharge surface is a substance in which two actions, that is, the ability to generate ozone and the ability to decompose ozone gas coexist.

Accordingly, since the two actions coexist, the ozone generation efficiency η in the metal compound to be fixed as the metal compound layer 1d to the discharge surface is a value determined by a difference between the ability to dissociate oxygen gas and generate ozone and the ability to catalytically dissociate and decompose ozone gas in the photocatalytic state of the applied substance.

Although the two actions coexist, it can be said that the substance belonging to the first metal compound species 201 shown in the periodic table of FIG. 2 is a substance in which the ability to generate ozone is particularly greater than the ozone decomposition ability. The Mn, Co, Ni, Cu, and Ag-based metal compounds are easily activated (thermally excited) by low temperature thermal energy, and it can be said that the thermally excited substance is a substance in which the ability to catalytically decompose ozone gas is particularly greater than the ability to dissociate oxygen.

In the periodic table of FIG. 2, the element in which the electron orbital of the outermost shell is in the N-orbital (the element belonging to the second metal compound species 202) is easily activated (thermally excited) by applying high temperature thermal energy, and this thermally excited substance is a substance which enhances the ability to catalytically decompose ozone gas rather than the ability to dissociate oxygen. In the periodic table of FIG. 2, in an element in which the electron orbital of the outermost shell increases from the N-orbital to the O-orbital and the P-orbital, thermal excitation by high temperature thermal energy more hardly occurs, and the ability to decompose the ozone gas is weakened.

(Relationship Between Ozone Generation Efficiency and Ozone Concentration that can be Taken Out from Ozone Generator 1)

As stated above, the ozone generation efficiency η is the value determined by the difference between the ability to dissociate oxygen gas and generate ozone and the ability to catalytically dissociate and decompose ozone gas in the photocatalytic state of the applied substance. As shown in FIG. 10, the ozone concentration that can be taken out from the ozone generator 1 is determined by synthesis of the ozone generation amount (tangent La) that is determined by the ozone generation efficiency η and the specific power W/Q injected through discharge per unit volume and the degree of decrease (tangent Lc) in ozone concentration to be taken out that is dependent on an increase in rate (ozone decomposition rate σ) for decomposition of the generated ozone determined by the structure of the ozone generator 1 itself (gas velocity (flow rate), discharge gap length d, etc.) and gas conditions (gas temperature, gas pressure P, etc.).

Accordingly, in order to increase the ozone concentration that can be taken out from the ozone generator 1, as the first element (first and second features), selection of a substance of a metal compound having the enhanced ozone generation efficiency η, an increase of the surface area of the discharge surface, and an increase of the ozone generation amount by the injected specific power W/Q are required. As the second element (third feature), the ozone decomposition suppression requirement for reducing the amount of decomposition of the generated ozone amount determined by the structure and gas conditions of the ozone generator 1 itself is required to be imposed on the ozone generator 1. In the second element, since the structure of the ozone generator 1 itself is determined by the structural design of the ozone generator 1, the structure cannot be specified. However, the gas temperature included in the gas conditions significantly depends on the factor that the gas temperature is increased by the specific power W/Q injected to decompose generated ozone gas.

Hereinabove, in the present embodiment, as the metal compound, in a metal oxide compound in which two kinds of elements including a metal element are electronically combined, a high concentration ozone gas is generated, and the metal compound from which high concentration ozone can be taken out and which is fixed to the discharge surface has been described; however, a metal compound in which three kinds of elements including a main metal element are electronically combined or a metal compound other than oxidation may be used, and it is only necessary to satisfy the above-described four conditions. That is, in the four conditions, (1) the metal compound is not a substance promoting ozone decomposition, (2) the metal compound is not a conductor, (3) the metal compound is a dielectric in which the band gap of the metal compound having the semiconductor properties is in the range of 2.0 to 4.0 (eV), and (4) the metal compound having the semiconductor properties (hereinafter may be abbreviated as "semiconductor material") is brought into the excited state (photocatalytic state), and the metal compound is the semiconductor material in which the hole potential of the valence band portion formed in the excited state is larger than the binding potential (1.25 (eV)) of an oxygen molecule. If these conditions are satisfied, it is possible to catalytically dissociate oxygen gas by the excited and induced holes and generate a high concentration ozone gas, and to take out high concentration ozone.

(Gas Temperature in Discharge Space and Electrode Cooling Temperature of Electrodes 1a and 1b Forming Discharge Surface)

In order to increase the ozone concentration that can be taken out from the ozone generator 1, the ozone generation efficiency η is increased in the ozone generator 1, and the amount of ozone generated is increased. At the same time, with respect to the generated ozone amount, in order to impose the ozone decomposition suppression requirement for suppressing the ozone decomposition rate σ on the ozone generator 1, it is necessary to set the structure or setting means of the ozone generator 1, such as gas temperature during discharge, within an optimum condition range.

In the ozone generator 1 of the present embodiment, there are the following reactions (1) and (2) as ozone generation reactions resulting from activation of the metal compound material applied as the metal compound layer 1d onto the discharge surface.

The reaction (1) is "reaction of exciting a discharge surface with discharge light+oxygen catalytic dissociation reaction by contact of oxygen gas with excited metal", and the reaction (2) is "ozone generation reaction in three-body collision of oxygen atoms and oxygen molecules".

A series of reactions of the reaction (1) and the reaction (2) leads to ozone generation. With respect to a reaction time in the ozone generator 1, as the reaction time of the reaction (1), the reaction is completed in a very short time which is within a time range from emission of discharge light (start of discharge) to 10 μs order, and as for the ozone generation reaction time of the reaction (2), ozone gas is generated as long as it takes at most approximately 100 μs after generation of oxygen atoms in the reaction (1). That is, in a series of ozone generation reactions by the reaction (1) and the reaction (2), ozone gas is generated in the ozone generator 1 as long as it takes approximately several hundreds μs after occurrence of discharge supplied with predetermined electric power.

On the other hand, in order to take out the generated ozone gas, it has a gas passage time determined by the gas flow rate Q and the discharge space volume V. The gas passage time usually takes 10 ms to 200 ms, and this time requires a very long time of 1000 times to 20000 times compared with the ozone generation reaction time. Thus, the ozone generated in the gas passage time is exposed to a gas temperature Tg heated by discharge, and it is expended to decompose the generated ozone.

Thus, in the generated ozone, the ozone decomposition rate σ is determined by the gas passage time in the ozone generator 1 and the gas temperature Tg, the generated ozone is ozonolyzed in accordance with the ozone decomposition rate σ, and the ozone concentration that can be taken out depends on the ozone decomposition rate σ at the time of taking out ozone in the generator itself.

The gas temperature Tg in the ozone generator 1 that influences the ozone decomposition rate σ at the time of taking out ozone becomes higher as the specific power W/Q to be supplied becomes larger, and the gas temperature Tg can be lowered as the electrode cooling temperature T with respect to the electrodes 1a and 1b for cooling the ozone generator 1 from the outside becomes lower. That is, if the specific power W/Q to be supplied is constant, the lower the electrode cooling temperature T, the greater the effect of suppressing the ozone decomposition rate σ, and the ozone amount (ozone concentration) that can be taken out is increased.

Another gas passage time that influences the ozone decomposition rate σ at the time of taking out ozone depends on the gas flow rate Q, the discharge space volume V, and the gas pressure P. As the gas flow rate Q becomes larger, the ozone decomposition rate σ is suppressed, and although the amount of ozone that can be taken out increases, the ozone concentration that can be taken out is reduced corresponding to an increase in the flow rate. There shows a tendency that the larger the discharge space volume V, the longer the gas passage time, the larger the ozone decomposition rate σ, and the lower the ozone concentration that can be taken out. The discharge space volume V depends on the discharge gap length d of the generator, and in general, there shows a tendency that the larger the discharge gap length d, the larger the ozone decomposition rate σ, and the lower the ozone concentration that can be taken out.

Since the discharge gap length d is caused by an increase in gas temperature due to the specific power W/Q and a cooling ability of an electrode surface according to the discharge volume, if the discharge gap length d is excessively shortened, the ozone decomposition rate σ rather increases, and the ozone concentration that can be taken out is lowered; therefore, the discharge gap length d has an optimum range.

In the gas pressure P, in general, there shows a tendency that the higher the gas pressure, the longer the gas passage time, the larger the ozone decomposition rate σ, and the lower the ozone concentration that can be taken out. Since the gas pressure P is caused by a discharged state, the gas pressure P has an optimum range.

FIG. 11 is a characteristic diagram evaluating the ozone decomposition rate with respect to the discharge gap length d and the electrode cooling temperature T in the ozone generator in one embodiment.

From the viewpoint of suppressing the ozone decomposition rate, in performing evaluation with respect to the optimum electrode cooling temperature T and the optimum discharge gap length d, with respect to the discharge gap length d, there is a tendency that the ozone decomposition rate is most suppressed low at the discharge gap length d of 70 μm. When the discharge gap length d is longer than 70 μm, a time during which generated ozone gas passes through the discharge space becomes long, so that the ozone decomposition rate increases. When the discharge gap length d is shorter than 70 μm, although the time during which the ozone gas passes through the discharge space becomes shorter, the wall of the discharge space is narrowed, so that elements decomposed by contact of the generated ozone gas with the wall increase, and the ozone decomposition rate tends to be high.

With respect to the electrode cooling temperature T, as the electrode cooling temperature T becomes lower, the proportional ozone decomposition rate tends to be lower simply.

In the ozone generator 1 of the present embodiment, when the ozone decomposition rate is evaluated by the ozone generator in order to take out high concentration ozone gas, unless the ozone decomposition rate is suppressed to at least not more than 80%, almost all ozone generated in the ozone generator 1 is used at the gas temperature in the time during which the ozone passes through the discharge space, so that high concentration ozone gas cannot be taken out.

From the above results, in order to suppress the ozone decomposition rate to not more than 80%, the discharge gap length d of the ozone generator 1 needs to be set within the range of 0.02 mm to 0.12 mm. In addition, although the electrode cooling temperature T of the electrodes 1a and 1b of the ozone generator 1 needs to be set to not more than 40° C. from FIG. 11, in order to stably take out higher concentration ozone gas, the electrode cooling temperature T is desirably not more than 20° C.

Regarding the gas pressure P in the ozone generator 1, the upper limit pressure is determined by the time during which ozone passes through the discharge space, similarly to the discharge gap length d.

The lower limit pressure of the gas pressure P is determined by the pressure for enhancing the three-body collision reaction contributing to ozone generation. Accordingly, the gas pressure in the discharge space needs to be set within a range of 0.2 MPa to 0.4 MPa as an absolute pressure.

As shown in FIG. 10, the ozone concentration that can be taken out from the ozone generator 1 is determined by composition of the degree of decrease in ozone concentration that can be taken out (characteristic indicated by the tangent Lc) by the ozone generation amount (characteristic indicated by the tangent La) determined by the ozone generation efficiency η and the specific power W/Q injected by discharge per unit volume and the increase in rate (ozone decomposition rate σ) at which the generated ozone amount determined by the structure of the ozone generator 1 itself (gas velocity (flow rate Q), discharge gap length d, etc.) and gas conditions (gas temperature, gas pressure, etc.) is decomposed.

Accordingly, in order to increase the ozone concentration that can be taken out from the ozone generator 1, as the first element, selection of a substance of a metal compound having the enhanced ozone generation efficiency η, the increase of the surface area of the discharge surface, and the increase of the ozone generation amount by the injected specific power W/Q are required. As the second element, it is necessary to impose the ozone decomposition suppression requirement on the ozone generator 1 and to reduce the amount of decomposition of the generated ozone amount determined by the structure and gas conditions of the ozone generator 1 itself. In the second element, since the structure of the ozone generator 1 itself is determined by the structural design of the ozone generator 1, the structure cannot be specified. However, the gas temperature included in the gas conditions significantly depends on the factor that the gas temperature is increased by the specific power W/Q injected to decompose generated ozone gas.

As described above, as the factor of decomposing ozone gas, the gas temperature in the discharge space (ozone generation gas space) is very high, and it was experimentally found that when the gas temperature was not less than 20° C., the ozone decomposition rate became very high, and high concentration ozone gas could not be taken out.

As means for suppressing the gas temperature in the discharge space to a low level, if the gas temperature is cooled through the electrodes 1a and 1b constituting the discharge surface, the ozone decomposition rate can be suppressed. In other words, a structure allowing a coolant to flow through the electrodes on the discharge surface is provided, and the discharge surface of the electrodes 1a and 1b is always cooled to not more than 20° C., so that the gas temperature in the discharge space can be kept low by heat transfer, improvement in the ozone decomposition rate is observed, and there is a tendency to increase taking-out ozone concentration.

FIG. 9 is a characteristic diagram showing the maximum ozone concentration value Cmax value that can be taken out with respect to the ozone generation efficiency η from the list of the ozone generation efficiency η and the ozone concentration that can be taken out in each substance in FIG. 8. The concentration Co represents the threshold value of the high concentration ozone concentration defined in the present invention. In addition, ηo represents the minimum ozone generation efficiency η for obtaining high concentration ozone not less than the threshold value and further represents a limit value at which high concentration cannot be obtained as ozone that can be taken out unless the ozone generation efficiency η is not less than ηo. This value was about 0.01 (mg/J).

The characteristics 601 to 604 show the maximum ozone concentration characteristics that can be taken out with respect to the ozone generation efficiency η in the ozone generator 1 of the present embodiment, and each of the maximum ozone concentration characteristics 601 to 604 shows the characteristic in a case where the discharge surface temperature of the ozone generator 1 is kept constant by cooling to 40° C., 20° C., 0° C., and −20° C. This indicates that even with the same ozone generation efficiency η, the lower the discharge surface temperature, the higher the ozone concentration that can be taken out. In other words, this is caused by the fact that the discharge surface is cooled to lower the gas temperature and thus to decrease the ozone decomposition rate.

Accordingly, the high concentration ozone generatable range 3001 indicates the range from which high concentration ozone can be taken out, and it is found that the range of the ozone generation efficiency η and the suppression range of the ozone decomposition rate, from which the high concentration ozone can be obtained, are defined from the high concentration ozone generatable range 3001.

That is, as seen from the maximum ozone concentration characteristic 601, even if the metal compound layer in which the ozone generation efficiency η is high is fixed to the discharge surface, as the ozone decomposition rate increases, high concentration ozone cannot be taken out. In the present embodiment, when the cooling temperature of the discharge surface (the electrode cooling temperature T of the electrodes 1a and 1b) is set to a temperature exceeding 20° C., the ozone decomposition amount increases, and high concentration ozone cannot be taken out.

The high concentration ozone generation impossible range 3002 shows a range in which high concentration ozone cannot be taken out.

On the premise of the ozone generating method of the present invention, in order to obtain a high flow rate ozone gas with high concentration and high purity, a raw material gas having a high oxygen purity of not less than 99.99(%) and a large flow rate of 3 L/min is supplied to the ozone generator 1. As the ozone generator 1, a dielectric barrier discharge space (discharge space) as energy to be externally applied to oxygen gas is formed in a space through which the gas passes, so that predetermined discharge energy W is supplied to the ozone generator 1.

The discharge gap length d in the space (discharge space) through which the gas passes in the ozone generator 1 is provided, and the discharge surface through which the gas passes needs to have an area not less than the predetermined discharge area S. In order to remove generated ozone gas with high concentration and high purity without decomposition, the ozone decomposition suppression requirements are required to be imposed on the ozone generator 1. As the ozone decomposition suppression requirements, the discharge gap length d is within the range of 0.02 mm to 0.12 mm. the gas pressure in the discharge space is set within the range of 0.2 MPa to 0.4 MPa as an absolute pressure, and, in order to cool the ozone gas generated in the ozone generator 1, the electrode cooling temperature T is set to not more than 20° C.

(Effect of the Present Embodiment)

The present embodiment describes the ozone generating method for generating ozone using the ozone generator 1 having the electrodes 1a and 1b (first and second electrodes) facing each other and the dielectric 1c formed on the high voltage electrode 1a and having the discharge space between the dielectric 1c and the ground electrode 1b. In the ozone generator 1, the metal (element) compound layer 1d is further provided on the surface (discharge surface) of each of the ground electrode 1b and the dielectric 1c.

The metal compound in the metal compound layer 1d satisfies the condition (1) "the metal compound is not a substance promoting ozone decomposition", the condition (2) "the metal compound is not a conductor", the condition (3) "the band gap of the metal compound layer 1d is in the range of 2.0 to 4.0 [eV]", and the condition (4) "the hole potential of the valence band portion formed in the excited state of the metal compound layer 1d is larger than the binding potential (1.25 (eV)) of the oxygen molecule".

Then, the ozone generating method of the present embodiment using the ozone generator 1 executes the following steps (a) to (c).

The step (a) is a step of supplying a raw material gas mainly composed of oxygen gas to the discharge space.

The step (b) is a step of giving external energy by the ozone power supply 2, generating dielectric barrier discharge in the discharge space of the ozone generator 1, and bringing the metal compound layer 1d into the photocatalytic state by the discharge light, and thereby generating oxygen atoms from the raw material gas supplied in the step (a).

The step (c) is a step of generating ozone by a collision chemistry reaction between the oxygen atoms generated in the step (b) and the oxygen gas contained in the raw material gas.

In addition, as a step (d), the step (d) is a step of executing the steps (a) to (c) under an environment in which various ozone decomposition suppression requirements for suppressing a decomposition amount of ozone are imposed on the ozone generator 1.

In the ozone generating method of the present embodiment, by executing the steps (a) to (c) as described above, there is an effect of setting the ozone generation efficiency η to a predetermined value of not less than 0.01 mg/J in the ozone generator 1, and there is provided an effect that a high concentration ozone gas can be taken out from the ozone generator 1.

Further, in the ozone generating method of the present embodiment, when the ozone generator 1 is set under the environment in which the ozone decomposition suppression requirement is imposed in the step (d), a phenomenon of decomposition of the ozone generated in the step (c) is suppressed, and a higher concentration ozone gas can be taken out to the outside.

Even if a metal oxide layer ($Bi_2O3_3$) is used as the metal compound layer 1d with the use of bismuth as an element, or even if the metal compound layer 1d in which three elements are bonded is formed, when the metal compound layer 1d satisfies the above-described conditions (1) to (4), the effect that a high concentration ozone gas can be taken out is provided.

In the present embodiment, it is characterized that the metal compound constituting the metal compound layer 1d is a powder having a particle diameter of 0.1 to 50 (μm).

With this feature of the present embodiment, the surface area of the metal compound excited in the metal compound layer 1d can be increased, and the ozone generation efficiency η is further enhanced, so that the concentration of ozone that can be taken out is easily increased. As a result, there are provided effects that the electric power to be injected into the ozone generator 1 can be further reduced, and the ozone generator 1 can be miniaturized.

Further, in the present embodiment, as shown in FIG. 2, it is characterized that the main metal element contained in the metal compound layer 1d includes a metal element having an electron arrangement belonging to Groups 5 and 6 in the periodic table, and the metal compound includes a metal oxide layer ($CrO_3$, $WO_3$, $V_2O_5$, $MoO_3$, $NbO_5$, $Ta_2O_5$).

With this feature of the present embodiment, electrons in the electron orbital of the outermost shell of the main metal element of the metal compound layer 1d receive the light energy by the dielectric barrier discharge and easily move to the valence band, so that it is easy to excite the metal compound layer 1d into the photocatalytic state, and there is provided an effect of selectively and catalytically dissociating the oxygen gas passing through the discharge space.

The ozone generating method of the present embodiment is characterized in that the metal compound layer 1d has a body-centered cubic structure as its crystal structure.

With this feature of the present embodiment, when the surface of the metal compound layer 1d on the discharge space side is an ordered texture structure surface, light absorption can be effectively performed by reduction in surface reflection loss of the metal compound layer 1d having received irradiation with the discharge light of the dielectric barrier discharge generated in the discharge space and the light confining effect, so that the effect of increasing the ozone generation efficiency η is provided.

The metal compound layer 1d can be fixed to a fixation target portion, which is the discharge surface (at least one surface) of the ground electrode 1b and the dielectric 1c, by coating, blowing, baking, or surface bonding.

The effect of increasing the generation efficiency η can be provided by fixing the metal compound layer 1d to the fixation target portion with the use of the fixing method described above.

Further, the ozone generating method of the present embodiment is characterized in that the following requirements (d1) to (d3) are satisfied as the ozone decomposition suppression requirements imposed on the ozone generator 1 in the step (d).

The requirement (d1) is that "high purity oxygen gas having an oxygen gas purity of 99.99(%) is used as the raw material gas", the requirement (d2) is that "the gas flow rate at the time of supplying the raw material gas is not less than 3 (L/min)", and the requirement (d3) is that "a discharge power density in the dielectric barrier discharge is set within a range of 1 to 5 ($W/cm^2$), and a specific power amount W/Q value is set within a range of 300 to 500 (W·min/L)".

With this feature of the present embodiment, high concentration ozone can be generated in the ozone generator 1, the gas temperature heated with injection energy per unit volume due to discharge can be suppressed, and the ozone decomposition rate in the ozone generator 1 can be suppressed to not more than 80% to allow generation of high concentration ozone in which the ozone concentration that can be taken out is not less than 200 ($g/m^3$).

In addition, the ozone generating method of the present embodiment is characterized in that as the ozone decomposition suppression requirements imposed on the ozone generator 1 in the step (d), the requirement (d4) "the temperature (electrode cooling temperature T) of the electrodes 1a and 1b in the ozone generator 1 is set to not more than 20 (° C.)" is satisfied.

With this feature of the present embodiment, the raw material gas passing through the discharge space (on the discharge surface) can be cooled to a comparatively low temperature, the effect of suppressing a thermal decomposition rate of generated ozone is produced, and the ozone concentration that can be taken out is increased. As a result, there are provided effects that the ozone generation amount can be increased, the electric power injected into the ozone generator 1 can be further reduced, and the ozone generator 1 can be miniaturized.

In addition, the ozone generating method of the present embodiment is characterized in that the following requirements (d5) and (d6) are satisfied as the ozone decomposition suppression requirements imposed on the ozone generator 1 in the step (d).

The requirement (d5) is that "the discharge gap length d in the discharge space of the ozone generator 1 is set within the range of 0.02 to 0.12 (mm)", and the requirement (d6) is that "the gas pressure in the discharge space is set within the range of 0.2 to 0.4 (MPa) as an absolute pressure".

With this feature of the present embodiment, since it is possible to shorten a taking-out time for ozone gas generated in the discharge space, the effect of suppressing the thermal decomposition rate of generated ozone is produced, and the ozone concentration that can be taken out is increased. As a result, there are provided effects that the ozone generation amount can be increased, the electric power injected into the ozone generator 1 can be further reduced, and the ozone generator 1 can be miniaturized.

<Others>

In the present embodiment, although the dielectric 1c is provided on the high voltage electrode 1a, the dielectric 1c may be provided on the ground electrode 1b.

Although the nitrogen-free ozone generator which supplies oxygen (raw material gas) having a purity of not less than 99.99(%) is taken as an example of the ozone generator 1, the present invention is not limited to this and can also be applied to an ozone generator which supplies nitrogen-containing oxygen gas as a raw material gas.

While the invention has been shown and described in detail, the foregoing description is in all aspects illustrative and not restrictive. It is therefore understood that numerous modifications and variations can be devised without departing from the scope of the invention.

The invention claimed is:

1. An ozone generating method for generating ozone using an ozone generator which has first and second electrodes facing each other and a dielectric formed on said first electrode and has a discharge space between said dielectric and said second electrode,
   said ozone generator further having a metal compound layer provided on at least one surface of said second electrode and said dielectric,
   said metal compound layer satisfying the following conditions (1) to (4):
   (1) said metal compound layer is not a material promoting ozone decomposition,
   (2) said metal compound layer is not a conductor,
   (3) the band gap of said metal compound layer is in a range of 2.0 to 4.0 eV, and
   (4) the hole potential of a valence band portion formed in an excited state of said metal compound layer is larger than a binding potential 1.25 eV of an oxygen molecule,
   said ozone generating method comprising the steps of:
   (a) supplying a raw material gas mainly including oxygen gas to said discharge space;
   (b) giving external energy, generating dielectric barrier discharge in said discharge space, and bringing said metal compound layer into a photocatalytic state by a discharge light which is emitted by the dielectric barrier discharge to generate oxygen atoms from the raw material gas supplied in said step (a);
   (c) generating ozone by a collision chemistry reaction between the oxygen atoms generated in said step (b) and the oxygen gas contained in said raw material gas; and
   (d) executing said steps (a) to (c) under an environment in which an ozone decomposition suppression requirement for suppressing a decomposition amount of ozone is imposed on said ozone generator, wherein
   a metal compound constituting said metal compound layer is a powder having a particle diameter of 0.1 to 50 μm,
   a main metal element contained in said metal compound layer includes at least one of chromium (Cr), vanadium (V), tungsten (W), molybdenum (Mo), niobium (Nb), tantalum (Ta) and bismuth (Bi), and
   said metal compound layer includes a metal oxide layer.

2. The ozone generating method according to claim 1, wherein said metal compound layer has a body-centered cubic structure as a crystal structure of the metal compound layer.

3. The ozone generating method according to claim 1, wherein said metal compound layer is fixed to said at least one surface of said second electrode and said dielectric by coating, blowing, baking, or surface bonding.

4. The ozone generating method according to claim 1, wherein as said ozone decomposition suppression requirement imposed on said ozone generator in said step (d), the following requirements (d1) to (d3) are satisfied:
   (d1) high purity oxygen gas having an oxygen gas purity of 99.99% is used as said raw material gas,
   (d2) a gas flow rate at the time of supplying said raw material gas is not less than 3 L/min, and
   (d3) a discharge power density in said dielectric barrier discharge is set within a range of 1 to 5 W/cm$^2$, and a specific power amount W/Q value is set within a range of 300 to 500 Wmin/L.

5. The ozone generating method according to claim 1, wherein as the ozone decomposition suppression requirement imposed on said ozone generator in said step (d), the following requirement (d4) is satisfied:
   (d4) a temperature of said first and second electrodes in said ozone generator is set to not more than 20° C.

6. The ozone generating method according to claim 1, wherein as the ozone decomposition suppression requirement imposed on said ozone generator in said step (d), the following requirements (d5) and (d6) are satisfied:
   (d5) a gap length in a discharge space of said ozone generator is set within a range of 0.02 to 0.12 mm, and
   (d6) a gas pressure in said discharge space is set within a range of 0.2 to 0.4 MPa as an absolute pressure.

\* \* \* \* \*